(12) United States Patent
Yang et al.

(10) Patent No.: US 9,690,289 B2
(45) Date of Patent: Jun. 27, 2017

(54) MOBILE TERMINAL AND CONTROLLING METHOD THEREOF

(71) Applicant: LG ELECTRONICS INC., Seoul (KR)

(72) Inventors: Jeonghwa Yang, Seoul (KR); Hyerim Lee, Seoul (KR); Kyungha Lee, Seoul (KR); Hyejin Bae, Uijeongbu-si (KR); Jeonghwan Kim, Suwon-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/667,443

(22) Filed: Mar. 24, 2015

(65) Prior Publication Data

US 2016/0139595 A1    May 19, 2016

(30) Foreign Application Priority Data

Nov. 17, 2014 (KR) .................. 10-2014-0159996

(51) Int. Cl.
*G05D 1/00* (2006.01)
*B64C 39/02* (2006.01)
*G05D 1/10* (2006.01)

(52) U.S. Cl.
CPC ......... *G05D 1/0016* (2013.01); *B64C 39/024* (2013.01); *G05D 1/0038* (2013.01);
(Continued)

(58) Field of Classification Search
CPC ............ G05D 1/10; G06F 3/041; B64C 27/04
(Continued)

(56) References Cited

U.S. PATENT DOCUMENTS 8,983,684 B2 *   3/2015  Callou ................... A63H 27/12
                                                       701/1
9,004,973 B2 *   4/2015  Condon .................. A63F 13/00
                                                       446/37

(Continued)

OTHER PUBLICATIONS

PCT International Application No. PCT/KR2015/002032, Written Opinion of the International Searching Authority dated Aug. 13, 2015, 10 pages.

*Primary Examiner* — Thomas G Black
*Assistant Examiner* — Luke Huynh
(74) *Attorney, Agent, or Firm* — Lee, Hong, Degerman, Kang & Waimey

(57) ABSTRACT

A mobile terminal and controlling method thereof are disclosed. The present invention includes a communication module configured to transceive data with at least one drone, a display module configured to output a screen for controlling a motion of the drone, a touch interface module configured to receive a random touch drag within the displayed screen, and a controller controlling the communication module, the display module and the touch interface module, the controller generating a $1^{st}$ control data for controlling an altitude of the drone if the received touch drag is recognized as a $1^{st}$ direction, the controller generating a $2^{nd}$ control data for controlling right and left directions of the drone if the received touch drag is recognized as a $2^{nd}$ direction.

14 Claims, 34 Drawing Sheets

(52) U.S. Cl.
CPC ......... *G05D 1/0044* (2013.01); *G05D 1/0094* (2013.01); *G05D 1/102* (2013.01); *B64C 2201/146* (2013.01)

(58) Field of Classification Search
USPC .............................................. 701/2; 345/173
See application file for complete search history.

(56) References Cited

U.S. PATENT DOCUMENTS

| | | | |
|---|---|---|---|
| 2011/0221692 A1* | 9/2011 | Seydoux | A63H 27/12 345/173 |
| 2012/0232718 A1 | 9/2012 | Rischmuller et al. | |
| 2013/0289858 A1 | 10/2013 | Mangiat et al. | |
| 2014/0008496 A1 | 1/2014 | Ye et al. | |
| 2014/0142784 A1 | 5/2014 | Muren et al. | |
| 2016/0117853 A1* | 4/2016 | Zhong | H04N 5/2253 345/634 |

* cited by examiner

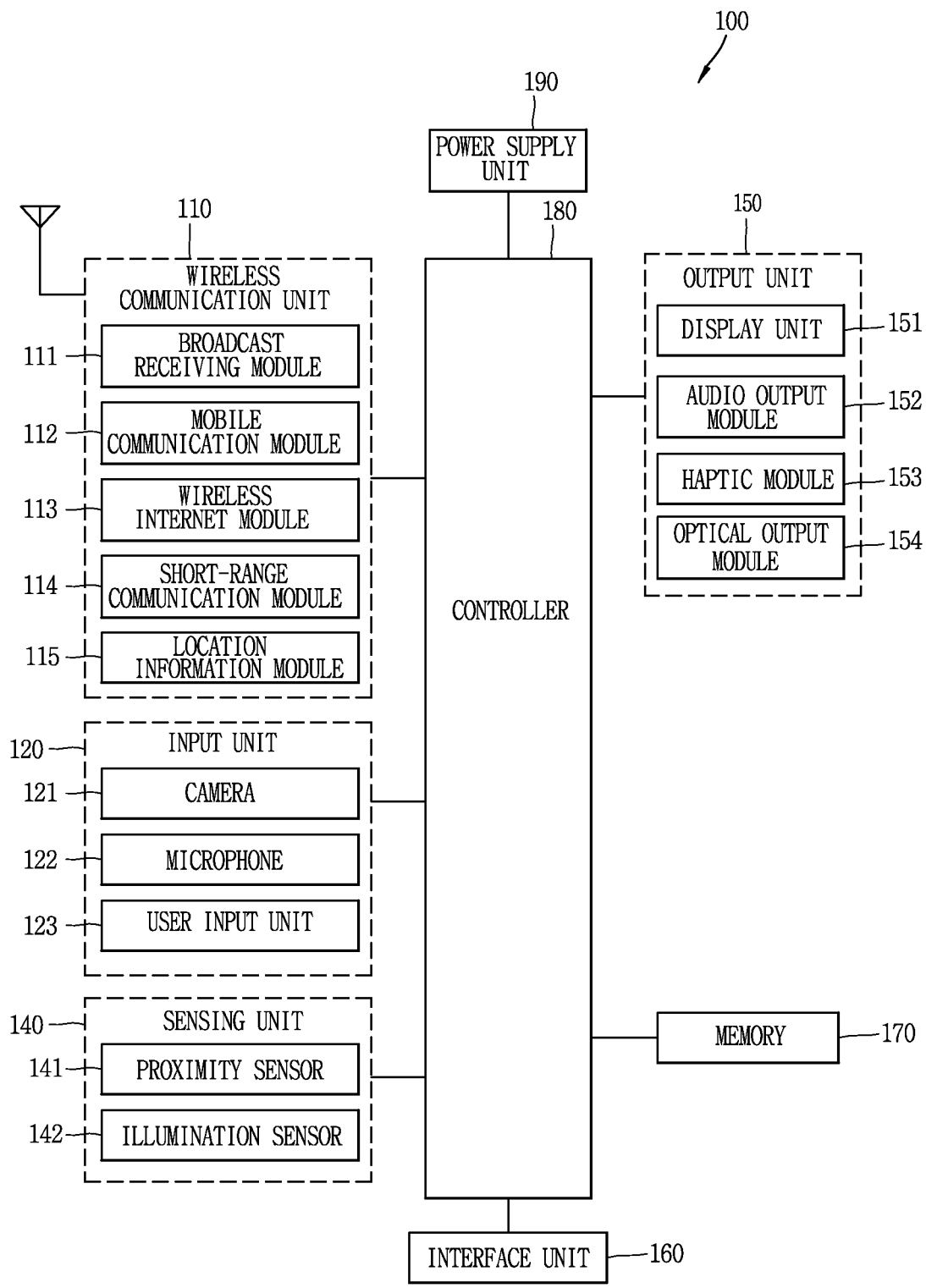

FIG. 7

| Touch drag of mobile terminal | Motion of drone |
|---|---|
| ↑ | Create command for raising altitude of drone |
| ↓ | Create command for lowering altitude of drone |
| ↺ | Create command for moving drone to touched point and then rotating drone in counterclockwise direction |
| | Create command for rotating drone in counterclockwise direction at current point |
| ↻ | Create command for moving drone to touched point and then rotating drone in clockwise direction |
| | Create command for rotating drone in clockwise direction at current point |
| ⋮ | ⋮ |

FIG. 17
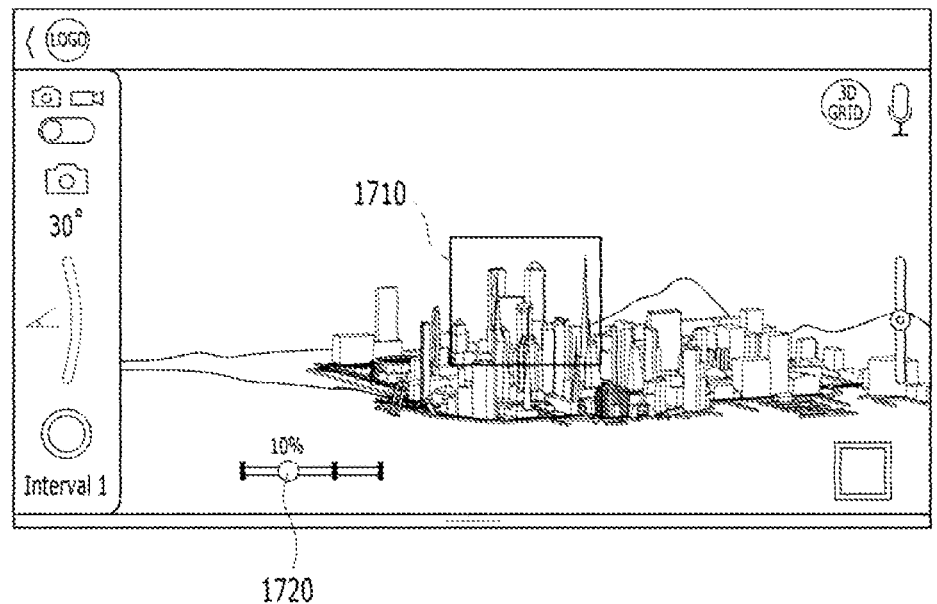
(a)
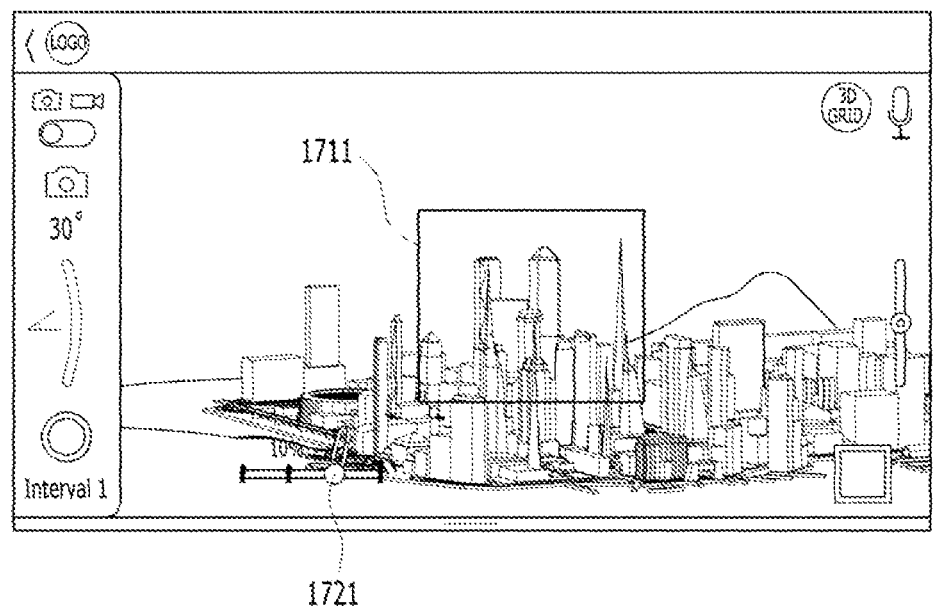
(b)

2. Shared photo or video is mapped onto a map to be viewed by other people

3. Play if photos or videos uploaded by other people around.

4. Edit by copying GPS/Track coordinate value or apply it to my drone intactly.

MOBILE TERMINAL AND CONTROLLING METHOD THEREOF

Pursuant to 35 U.S.C. §119(a), this application claims the benefit of earlier filing date and right of priority to Korean Application No. 10-2014-0159996, filed on Nov. 17, 2014, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for controlling a drone using the mobile terminal.

Discussion of the Related Art

Recently, a drone operable personally or by a company tends to be increasingly used. The drone means a flying object in an airplane or helicopter shape so as to fly in response to a radio control signal without a pilot on board. However, in order to control the drone, a separate device is necessary so as to incur unnecessary costs.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a solution for facilitating a drone to be controller using the mobile terminal held by a user mostly.

Another object of the present invention is to provide a mobile terminal and controlling method thereof, by which a UX/UI necessary to control a drone is optimized to the mobile terminal.

Further object of the present invention is to provide a mobile terminal and controlling method thereof, by which a drone can be controlled through an additional communication with a $3^{rd}$ device (e.g., a server, another mobile terminal, etc.).

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a method of controlling a mobile terminal according to one embodiment of the present invention may include the steps of performing a communication connection to at least one drone, displaying a screen for controlling a motion of the communication-connected drone, receiving a random touch drag within the displayed screen, generating a $1^{st}$ control data for controlling an altitude of the drone if the received touch drag is recognized as a $1^{st}$ direction, with reference to a memory, generating a $2^{nd}$ control data for controlling right and left directions of the drone if the received touch drag is recognized as a $2^{nd}$ direction, with reference to the memory, transmitting at least one of the generated $1^{st}$ control data and the generated $2^{nd}$ control data to the drone, and receiving a video data shot through a camera of the drone.

In another aspect of the present invention, as embodied and broadly described herein, a mobile terminal according to one embodiment of the present invention may include a communication module configured to transceive data with at least one drone, a display module configured to output a screen for controlling a motion of the drone, a touch interface module configured to receive a random touch drag within the displayed screen, and a controller controlling the communication module, the display module and the touch interface module, the controller generating a $1^{st}$ control data for controlling an altitude of the drone if the received touch drag is recognized as a $1^{st}$ direction, the controller generating a $2^{nd}$ control data for controlling right and left directions of the drone if the received touch drag is recognized as a $2^{nd}$ direction.

Accordingly, the present invention provides the following effects and/or features.

First of all, according to at least one of embodiments of the present invention, a solution for facilitating a drone to be controller using a mobile terminal held by a user mostly can be provided.

Secondly, according to at least one of embodiments of the present invention, a UX/UI necessary to control a drone is optimized to a corresponding mobile terminal.

Thirdly, according to at least one of embodiments of the present invention, a drone can be controlled through an additional communication with a $3^{rd}$ device (e.g., a server, another mobile terminal, etc.).

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

FIG. 1A is a block diagram of a mobile terminal in accordance with the present disclosure.

FIG. 7 is a diagram for one example of a database saved in a memory of a mobile terminal according to one embodiment of the present invention;

FIGS. 9 to 18 are diagrams to describe a $1^{st}$ mode for controlling a drone using a mobile terminal according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
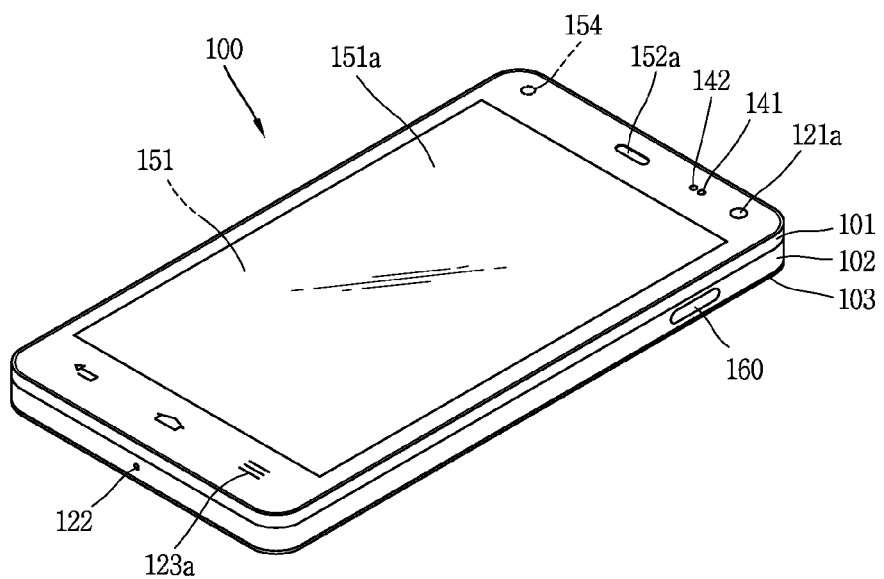
FIGS. 1B and 1C are conceptual views of one example of the mobile terminal, viewed from different directions.
Figure 1C:
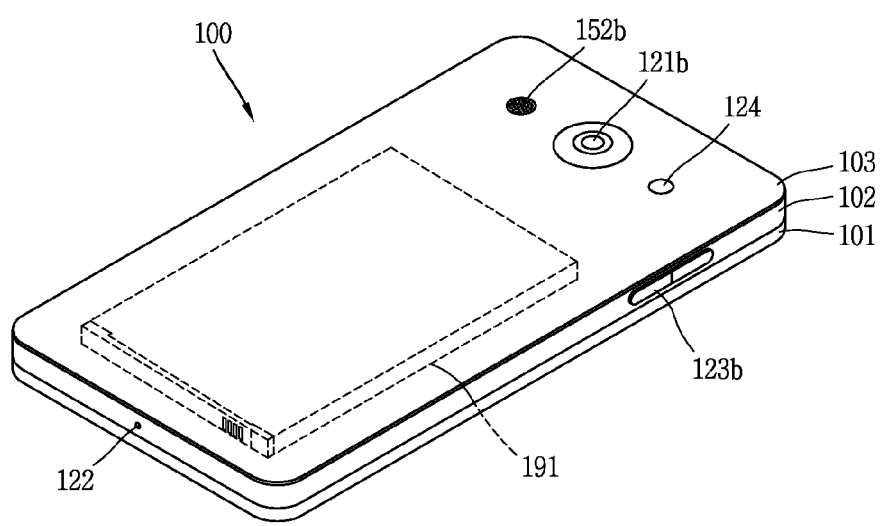

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
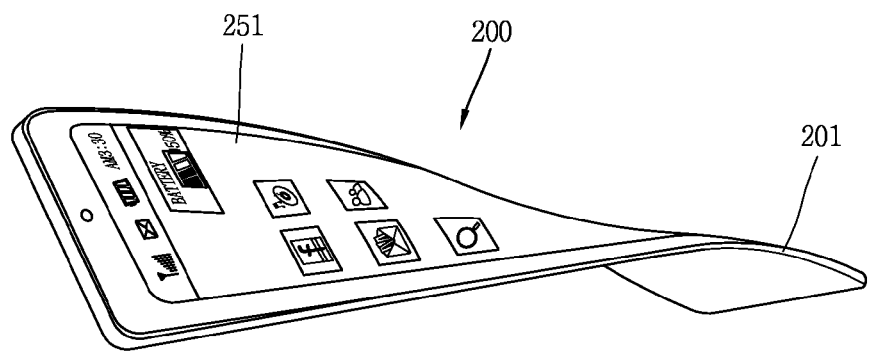
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
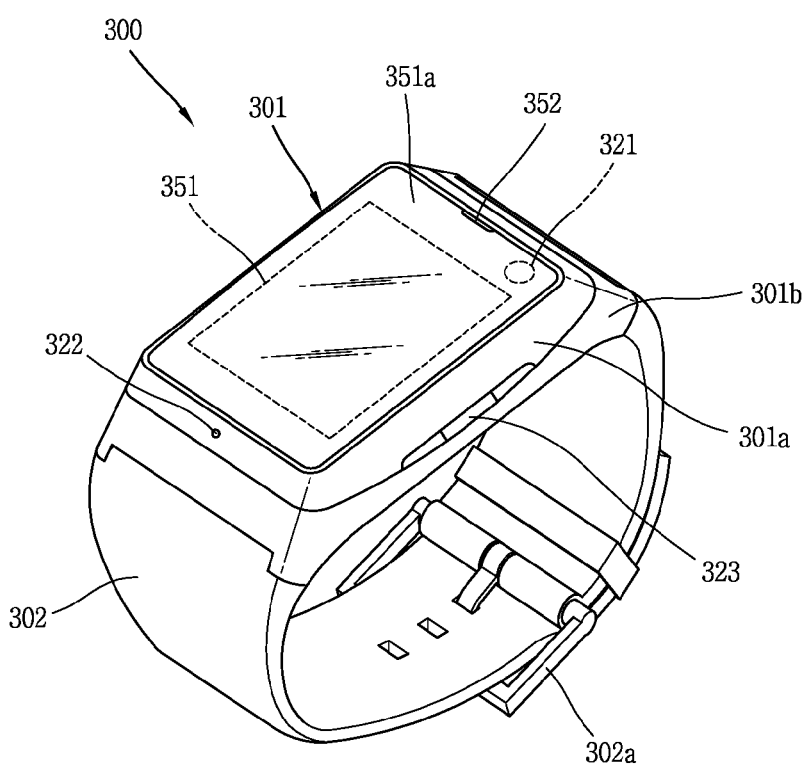
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
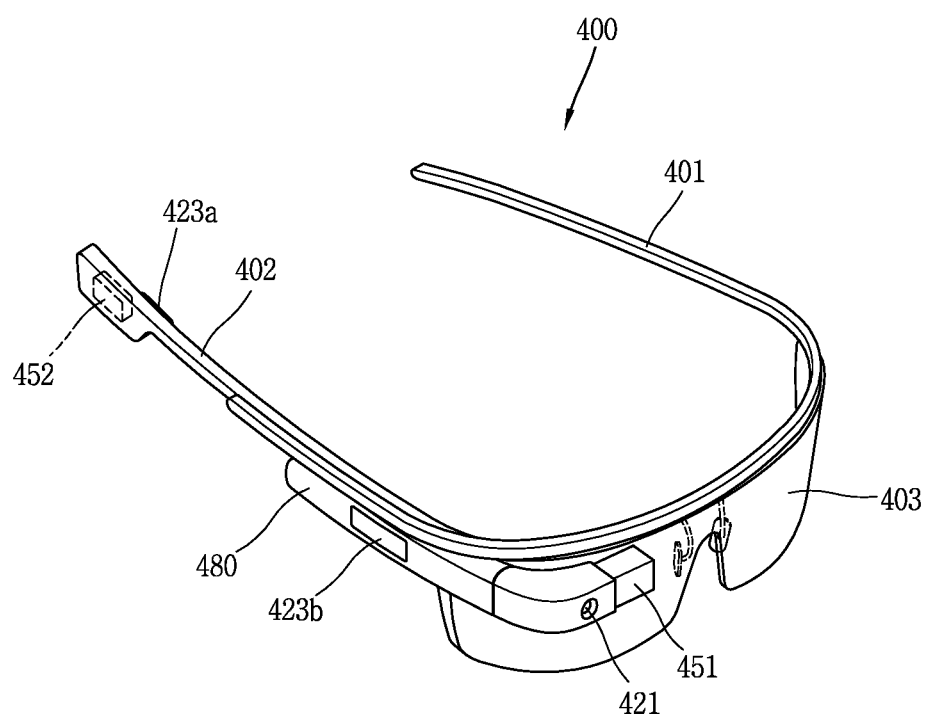
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Specifically, a mobile terminal configured to control a drone is described in detail with reference to FIGS. 5 to 34 as follows. Yet, with reference to FIGS. 1 to 4 mentioned in the foregoing description, FIGS. 5 to 34 can be supplementarily interpreted or the former embodiments shown in FIGS. 5 to 34 can be modified, by those skilled in the art to which the present invention pertains.

Figure 5:
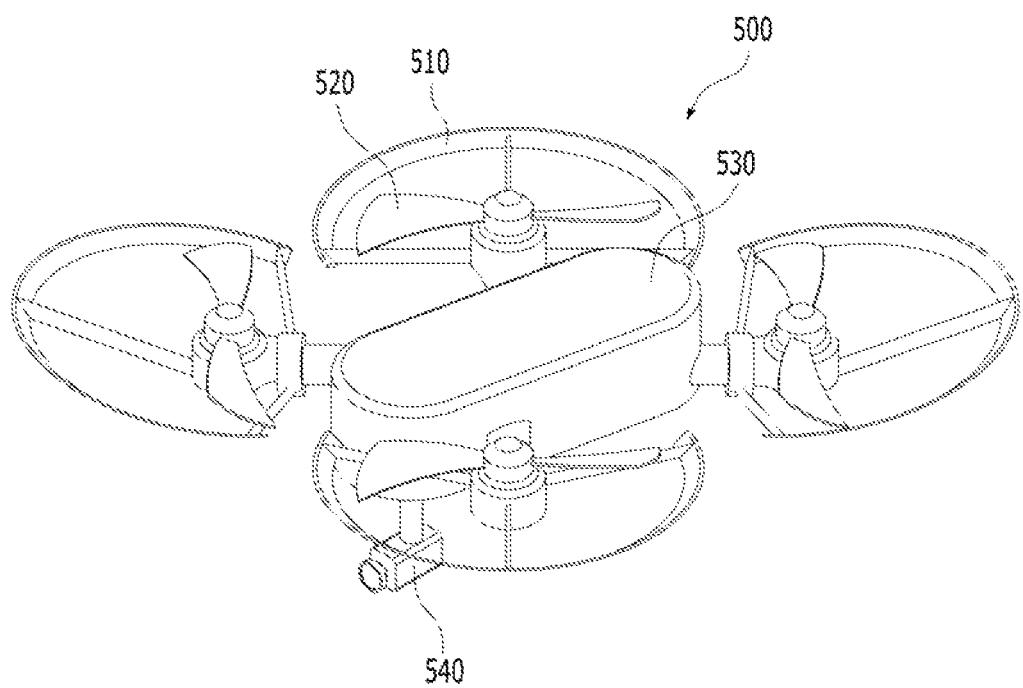
FIG. 5 is a diagram for one example of an exterior of a drone controlled by a mobile terminal according to one embodiment of the present invention.

FIG. 5 is a diagram for one example of an exterior of a drone controlled by a mobile terminal according to one embodiment of the present invention.

Referring to FIG. 5, a drone 500 may include a propeller guard 510, a propeller 520, a body 530, a camera 540 and the like. Yet, the scope of the appended claims and their equivalents of the present invention may be non-limited by the configuration of the drone 500 shown in FIG. 5. In particular, the present invention is applicable to drones of various types including a helicopter type (e.g., a tricopter with 3 propellers, a quadcopter with 4 propellers shown in FIG. 5, an octacopter with 8 propellers, etc.), an airplane type and the like.

The propeller guard 510 is configured to prevent a human or animal from being hurt by an operation of the propeller 520 and may be omitted. The propeller 520 and the camera 540 operate in response to a control signal of the body 530. And, a wireless communication module configured to communicate with a mobile terminal is included in the body 530. This is described in detail with reference to FIG. 6 as follows.

Figure 6:
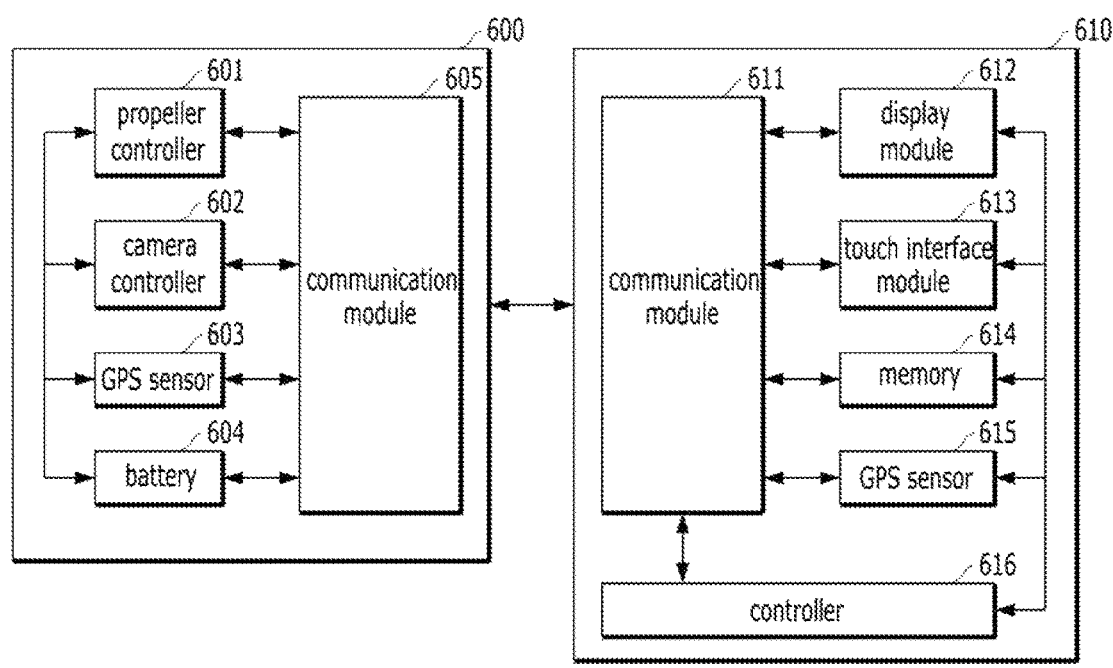
FIG. 6 is a block diagram of internal component modules of a drone and a mobile terminal according to one embodiment of the present invention.

FIG. 6 is a block diagram of internal component modules of a drone and a mobile terminal according to one embodiment of the present invention. A drone 600 shown in FIG. 6 can be supplementarily interpreted with reference to the former drone 500 shown in FIG. 5.

Referring to FIG. 6, a drone 600 and a mobile terminal 610 are designed to communicate with each other. To this end, the drone 600 includes a communication module 605. And, the mobile terminal 610 includes a communication module 611 as well. Moreover, both of the communication modules 605 and 611 are designed to use the same frequency. Particularly, command or control data generated by the mobile terminal 610 is delivered to the communication module 605 of the drone 600 through the communication module 611 of the mobile terminal 610.

A propeller controller 601 controls the propeller 520 shown in FIG. 5. A camera controller 502 controls the camera 540 shown in FIG. 5. Location information of the drone 600 detected through a GPS sensor 603 is shared with the mobile terminal 610. And, a battery 604 plays a role supplying a power necessary for each module. Moreover, the GPS sensor 603 means a sensor configured to precisely detect a location of a corresponding device using satellites. Yet, the present invention is non-limited by the GPS sensor. And, it is apparent to those skilled in the art that the GPS sensor can be replaced by a location information sensor of a different type capable of detecting a location of a corresponding device.

Besides, the drone 600 includes a ultrasonic sensor and an infrared sensor and is designed to prevent itself from colliding with neighboring objects [not shown in the drawing]. Of course, if a recognition of a front image is available through the camera controller 602, the ultrasonic sensor or the infrared sensor may be omitted.

Components of the mobile terminal 610 configured to control the above-described drone 600 are described in detail as follows.

First of all, referring to FIG. 6, the mobile terminal 610 may include a communication module 611, a display module 612, a touch interface module 613, a memory 614, a GPS sensor 615, a controller 616 and the like. Of course, deletion/addition/modification of the modules may belong to the scope of the appended claims and their equivalents of the present invention in part if necessary. And, the mobile terminal 610 shown in FIG. 6 can be supplementarily interpreted with reference to the former drawings mentioned in the foregoing description by those skilled in the art to which the present invention pertains.

The communication module 611 is designed to be capable of data transmission and reception to/from at least one drone 600. The display module 612 outputs a screen for controlling a motion of the drone 600.

The touch interface module 613 receives a random touch frag within the displayed or outputted screen. And, the controller 616 controls the communication module 611, the display module 612, the touch interface module 613 and the like.

If the received touch drag is recognized as applied in a $1^{st}$ direction, the controller 616 generates a $1^{st}$ control data for controlling an altitude of the drone. If the received touch drag is recognized as applied in a $2^{nd}$ direction, the controller 616 generates a $2^{nd}$ control data for controlling right and left directions of the drone 600.

According to another embodiment of the present invention, the controller 616 is designed to control the communication module 611 to transmit at least one of the generated $1^{st}$ control data and the generated $2^{nd}$ control data to the drone 600 and is also designed to receive video data shot through the camera of the drone 600. If a signal of selecting a random point within the displayed screen is received through the touch interface module 613, the controller 616 controls the communication module 611 to transmit a location information of an object corresponding to the point to the drone 600 and receives a video data including the object from the drone 600. If a touch drag of a circle type is received through the touch interface module 613, the memory 614 is designed to save at least two photos taken in accordance with a direction of the circle type as a single file. For instance, the screen includes a map containing a location of the mobile terminal 610.

According to further embodiment of the present invention, the display module 612 displays a specific location information in the map and at least one or more photos belonging to a preset range. In this case, the photo is characterized in being received from an external server.

According to further embodiment of the present invention, the controller 616 is designed to control the communication module 611 to extract a tag information of a specific photo selected from the at least one or more photos, to transmit the extracted tag information to the drone 600, and to receive a video data shot on the basis of the tag information from the drone 600. In this case, the tag information includes at least one of a GPS location information and a direction information of a taken photo for example.

FIG. 7 is a diagram for one example of a database saved in a memory of a mobile terminal according to one embodiment of the present invention. In order to change a motion of the drone in response to the touch drag described with reference to FIG. 6, it is necessary for a related database to be saved in a memory of a mobile terminal.

Referring to FIG. 7, if a touch drag in an up-direction is recognized in a mobile terminal, a command or control data for raising an altitude of a drone is generated. Subsequently, the generated command or control data is transmitted to the drone.

Moreover, if a touch drag in a down-direction is recognized in a mobile terminal, a command or control data for lowering an altitude of a drone is generated. Subsequently, the generated command or control data is transmitted to the drone.

On the other hand, if a touch drag in a counterclockwise direction is recognized in a mobile terminal, it is able to selectively generate commands of two types. Of course, an operation of mapping and saving a command of a single type belongs to the scope of the appended claims and their equivalents of the present invention. For instance, it is able to generate a command for moving a drone to a touched point and then rotating the drone in a counterclockwise direction or a command for rotating a drone in a counterclockwise direction at a current location of a drone.

Finally, if a touch drag in a clockwise direction is recognized in a mobile terminal, it is able to selectively generate commands of two types. Of course, an operation of mapping and saving a command of a single type belongs to the scope of the appended claims and their equivalents of the present invention. For instance, it is able to generate a command for moving a drone to a touched point and then rotating the drone in a clockwise direction or a command for rotating a drone in a clockwise direction at a current location of a drone.

Figure 8:
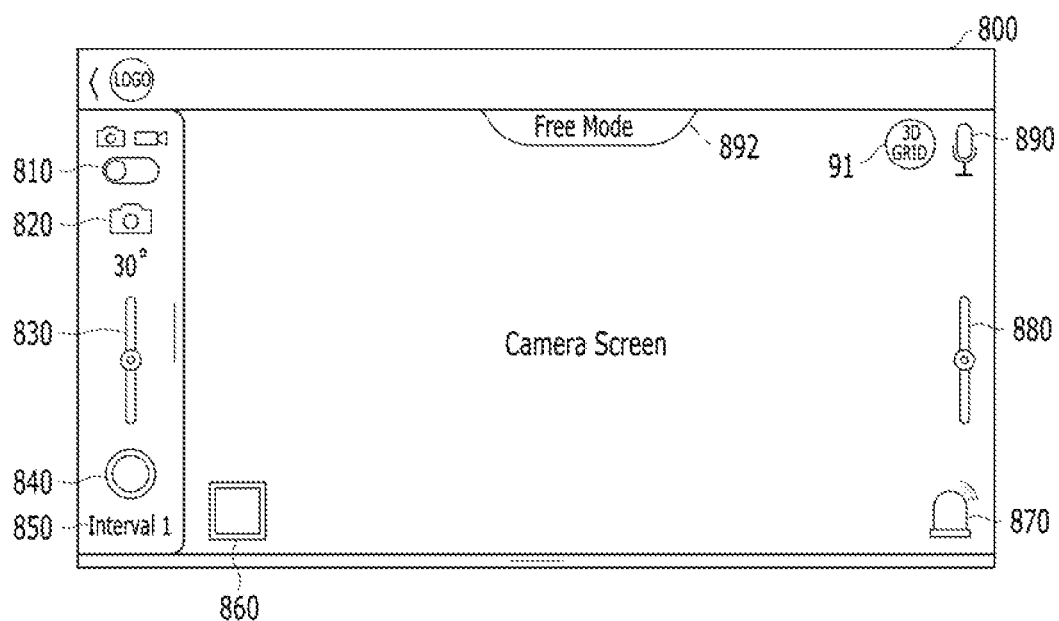
FIG. 8 is a diagram of a basic menu screen of a mobile terminal according to one embodiment of the present invention.

FIG. 8 is a diagram of a basic menu screen of a mobile terminal according to one embodiment of the present invention. It is possible to move a location of a drone or the like in response to a touch signal recognized from a screen of a mobile terminal shown in FIG. 8. Hence, it is unnecessary to produce a separate device.

Referring to FIG. 8, a mobile terminal 800 provides various options to control a drone. First of all, a $1^{st}$ option 810 is an option to select a camera mode of the drone and is used to determine one of a photo taking mode and a video shooting mode.

A $2^{nd}$ option 820 is used to change a direction of a camera installed on the drone. A $3^{rd}$ option 830 is used to adjust a photographing angle of the camera installed on the drone. A $4^{th}$ option 840 is used to generate a command at the moment of intending to take a photo in a screen currently shot by the drone. Particularly, the $4^{th}$ option 840 may be named a shutter button.

When photos are consecutively taken in a screen currently shot by the drone, a $5^{th}$ option 850 is used to determine an interval. A $6^{th}$ option 860 is used to display a photo taken right before a last shot.

A $7^{th}$ option 870 is related to an emergency for moving the drone to a location at which the mobile terminal is located. An $8^{th}$ option 880 is used to adjust a moving speed of the drone.

A $9^{th}$ option 890 is an option prepared to use a voice command to control the drone instead of using a touch signal. A $10^{th}$ option 891 is used to switch a video data (shot by the drone) currently outputted through a screen of the mobile terminal 800 to a screen on a 3D map. And, an $11^{th}$ option 892 is used to determine a mode for controlling the drone. Particularly, in the present specification, total 4 kinds of embodiments are proposed as the modes for controlling the drone. And, the respective modes are described in detail with reference to the accompanying drawings as follows.

FIGS. 9 to 18 are diagrams to describe a $1^{st}$ mode for controlling a drone using a mobile terminal according to one embodiment of the present invention. In the following drawings, a term 'FREE MODE' is used instead of the $1^{st}$ mode.

Referring to FIGS. 9 to 18, a free mode determines a moving direction of a drone by recognizing a user's touch drag signal.

Figure 9:
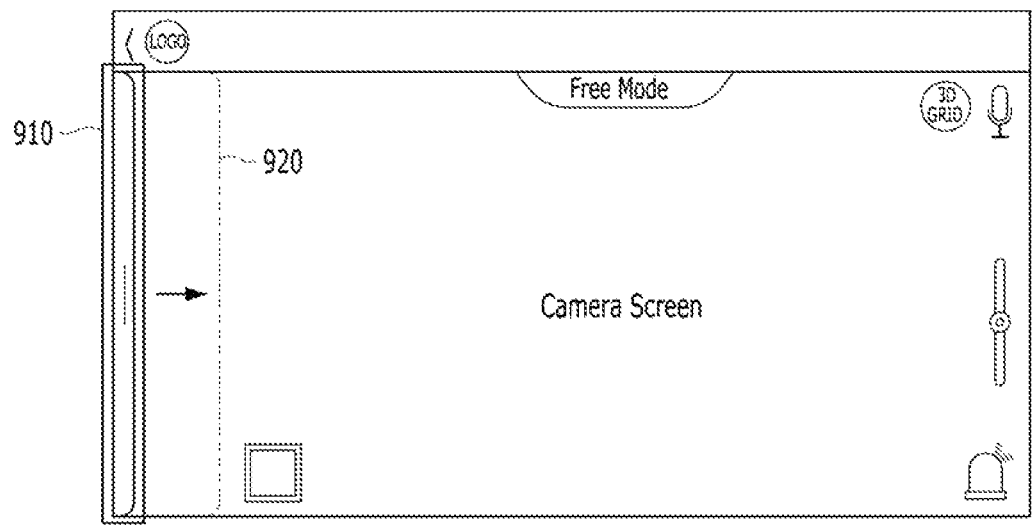

First of all, referring to FIG. 9, detailed options to control a drone in a $1^{st}$ mode (i.e., free mode) may be hidden on a prescribed side 910 of a screen or can be displayed as an extended form 920 in accordance with user's necessity. The extended form 920 shown in FIG. 9 includes at least one of the options shown in FIG. 8.

Figure 10:
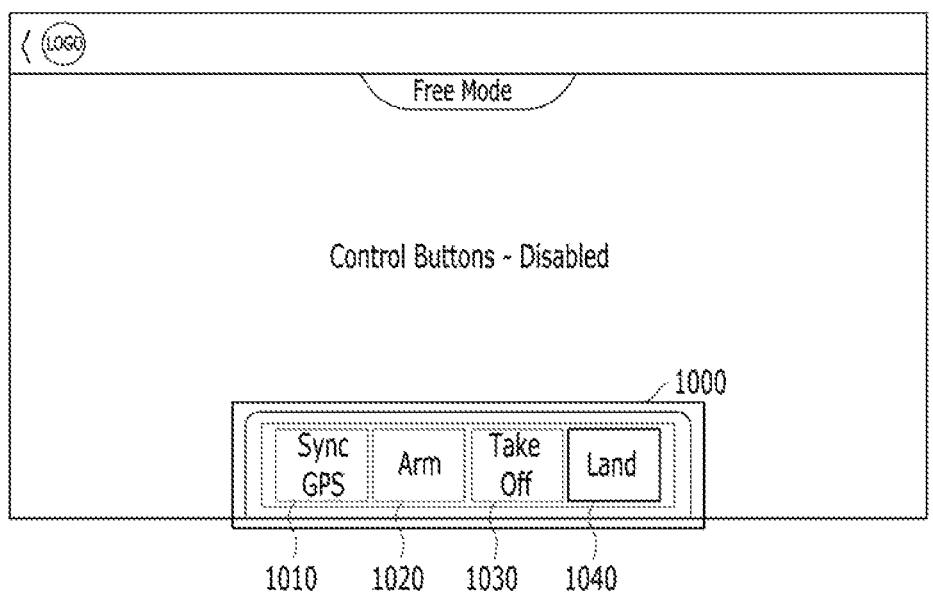

Meanwhile, referring to FIG. 10, basic options 1000 for controlling a drone are located on a bottom end of a mobile terminal. For instance, if a user moves a touch drag in a bottom-to-top direction, a drone launch menu 1000 is displayed. On the other hand, if a user moves a touch drag in a top-to-bottom direction, the drone launch menu 1000 disappears.

The drone launch menu 1000 includes 4 sub-options for example. A sync GPS related sub-option 1010 is used for a mobile terminal and a drone to share GPS information with each other. An arm related sub-option 1020 is used to control a guard of a propeller installed on the drone. A takeoff related sub-option 1030 is used to enable the drone to take off initially. A land related sub-option 1040 is used to enable the drone to land. Of course, the scope of the appended claims and their equivalents of the present invention is non-limited by the above-mentioned terms. And, the above-mentioned terms are available for other modes.

Figure 11:
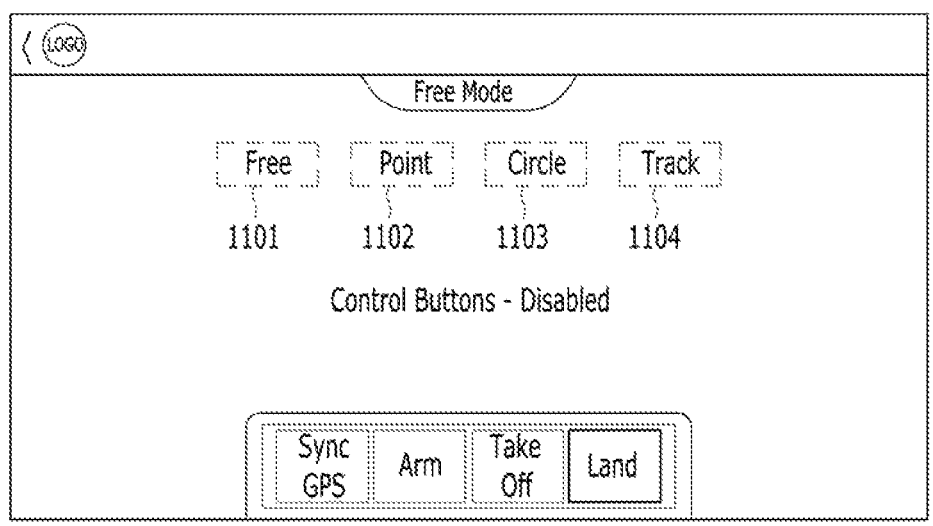

Referring to FIG. 11, a user is able to select 4 kinds of modes to control a drone. The 4 kinds of modes may include a free mode 1101, a point mode 1102, a circle mode 1103 and a track mode 1104. The point mode 1102 shall be described in detail with reference to FIGS. 19 to 21. The circle mode 1103 shall be described in detail with reference to FIGS. 22 to 24(c). And, the track mode 1104 shall be described in detail with reference to FIGS. 25 to 29.

Figure 12:
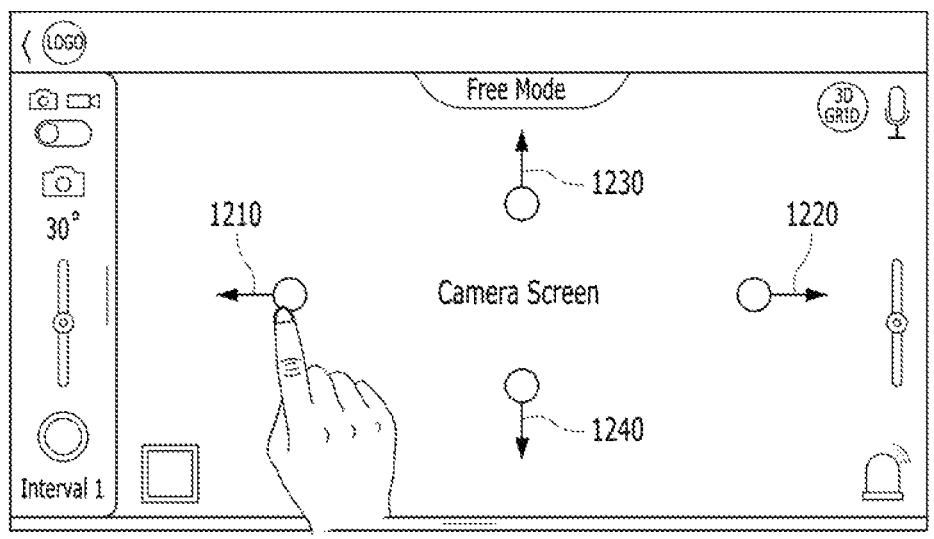

Referring to FIG. 12, in a free mode, a moving direction of a drone is determined in response to a user's touch drag action. For instance, if a touch drag signal is recognized in a left direction 1210 on a screen of a mobile terminal, the mobile terminal transmits a command for moving the drone in the left direction to the drone.

Moreover, if a touch drag signal is recognized in a right direction 1220 on a screen of a mobile terminal, the mobile terminal transmits a command for moving the drone in the right direction to the drone.

Meanwhile, if a touch drag signal is recognized in a top direction 1230 on a screen of a mobile terminal, the mobile terminal transmits a command for moving the drone in the top direction (to raise an altitude) to the drone. If a touch drag signal is recognized in a bottom direction 1240 on a screen of a mobile terminal, the mobile terminal transmits a command for moving the drone in the bottom direction (to lower an altitude) to the drone.

Figure 13:
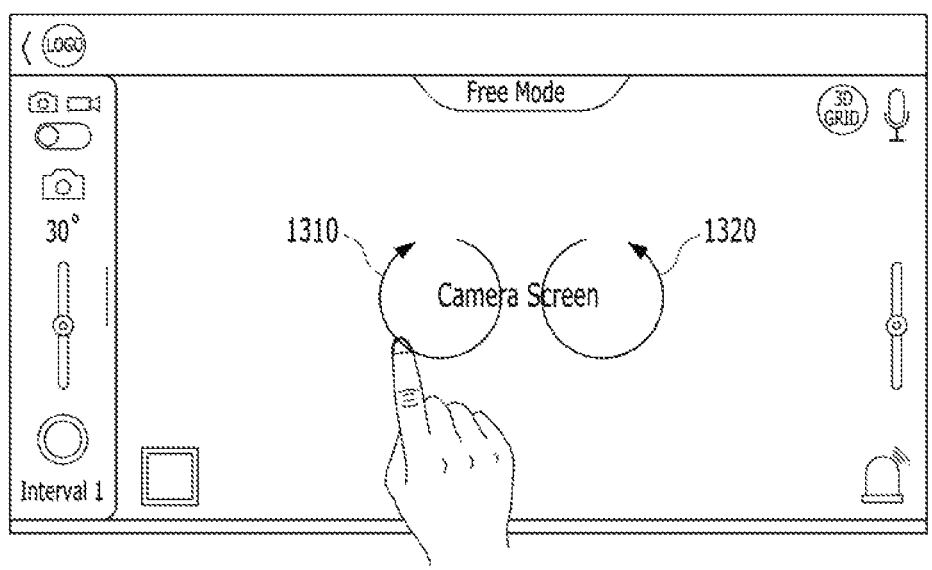
Figure 14:
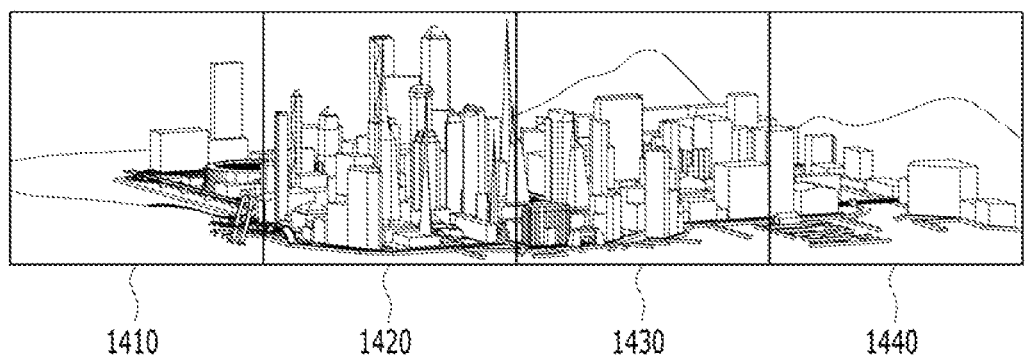

Unlike FIG. 12, FIG. 13 shows one embodiment for determining a rotational direction of a drone. For instance, referring to FIG. 13, if a touch drag signal rotating in a clockwise direction 1310 on a screen of a mobile terminal is recognized, the mobile terminal transmits a command for rotating the drone in the clockwise direction to the drone.

On the other hand, if a touch drag signal rotating in a counterclockwise direction 1320 on a screen of a mobile terminal is recognized, the mobile terminal transmits a command for rotating the drone in the counterclockwise direction to the drone. Besides, referring to FIG. 14, the drone is designed to save images taken by rotating at 360 degrees in a panoramic view in a memory or to transmit the images to a mobile terminal Particularly, $1^{st}$ to $4^{th}$ images 1410, 1420, 1430 and 1440 correspond to images taken at different angles at the same altitude, respectively.

Figure 15:
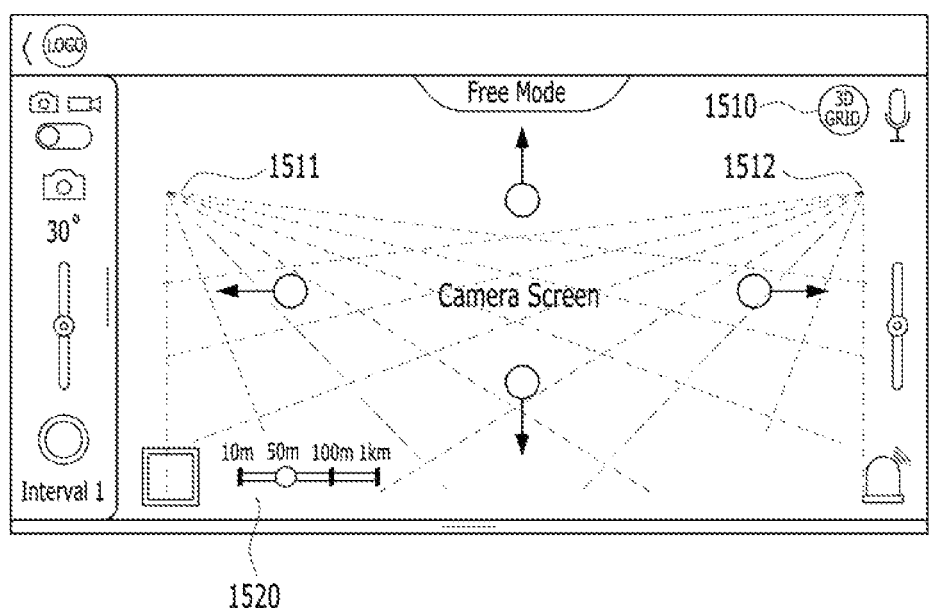

FIG. 15 shows a 3D grid guide line. For instance, if a specific option 1510 shown in FIG. 15 is selected, a screen taken by a drone is outputted through a 3D map. If the specific option 1510 is selected again, the screen taken by the drone is outputted through a 2D map. In particular, as a 3D grid map is created and outputted with reference to two reference points 1511 and 1512, it is advantageous in that a view captured by a camera of the drone can be more elaborately adjusted by a user.

Moreover, if a random point or a specific point is touched over a predetermined time, as shown in FIG. 15, an indicator 1520 for adjusting a distance unit on the 3D map is additionally displayed.

In the former drawings, a touch drag is assumed as a command for adjusting a location of a drone in free mode. On the other hand, in FIG. 16, in order to move a drone to a specific location, a pinch-out touch signal is assumed instead of a touch drag.

Figure 16:
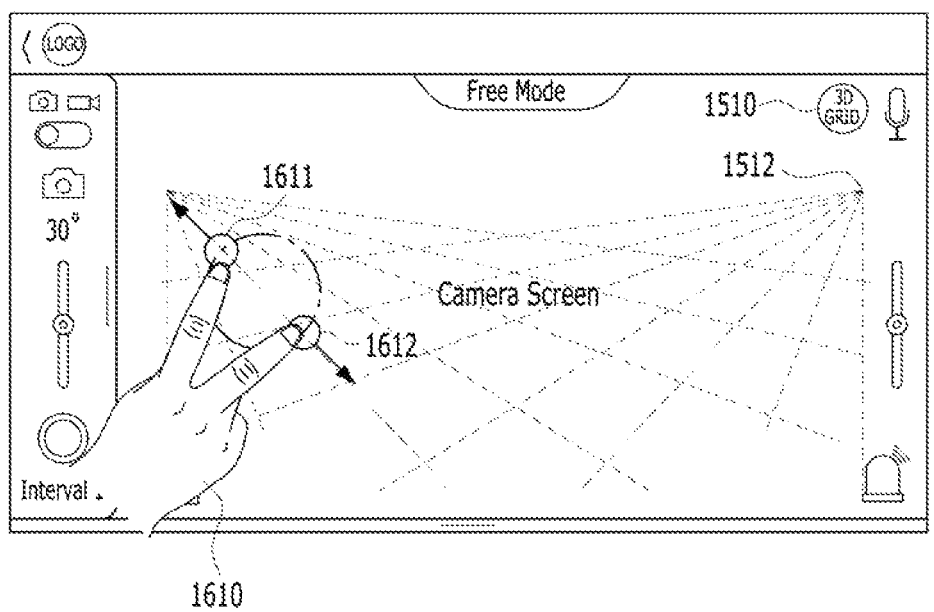

For instance, referring to FIG. 16, if a user applies a drag in an internal direction while simultaneously touching two points 1611 and 1612 (such action is generally called a pinch-out action), a command for moving a drone to a center point between the two points 1611 and 1612 is automatically generated and then transmitted to the drone. Yet, FIG. 16 assumes the 3D grid guide line shown in FIG. 15, by which the present invention is non-limited.

According to another embodiment of the present invention, it is designed to change a photograph mode depending on a user's touch gesture. For instance, if the circle type touch gesture 1310/1320 shown in FIG. 13 is recognized from a preview screen outputted by a mobile device, a panoramic photograph mode is automatically entered [cf. FIG. 14]. On the other hand, if the pinch-in/out type touch gesture 1611 and 1612 shown in FIG. 16 is recognized from a preview screen outputted by a mobile device, a burst photograph mode is automatically entered. In this case, the burst photograph mode corresponds to a function of taking pictures consecutively in a predetermined time interval.

FIG. 17 assumes a case that a landmark can be automatically recognized by a mobile terminal or a drone.

Referring to FIG. 17, if a specific landmark 1710 is included in a video currently shot by a drone [FIG. 17 (a)], it is designed that the specific landmark 1720 is shot by enlargement [FIG. 17 (b)]. In particular, assuming that a magnification of the video shot in FIG. 17 (a) is 10% 1720, a magnification of the video shot in FIG. 17 (b) is enlarged into 20% 1721. In particular, it means that the specific landmark is shot in an enlarged state.

Moreover, it is possible to design that a subject corresponding to a landmark shown in FIG. 17 is always outputted through a screen of a mobile terminal. For instance, if it is designed for a drone to shoot a subject by rotating around the subject, it may belong to another scope of the appended claims and their equivalents of the present invention.

Figure 18:
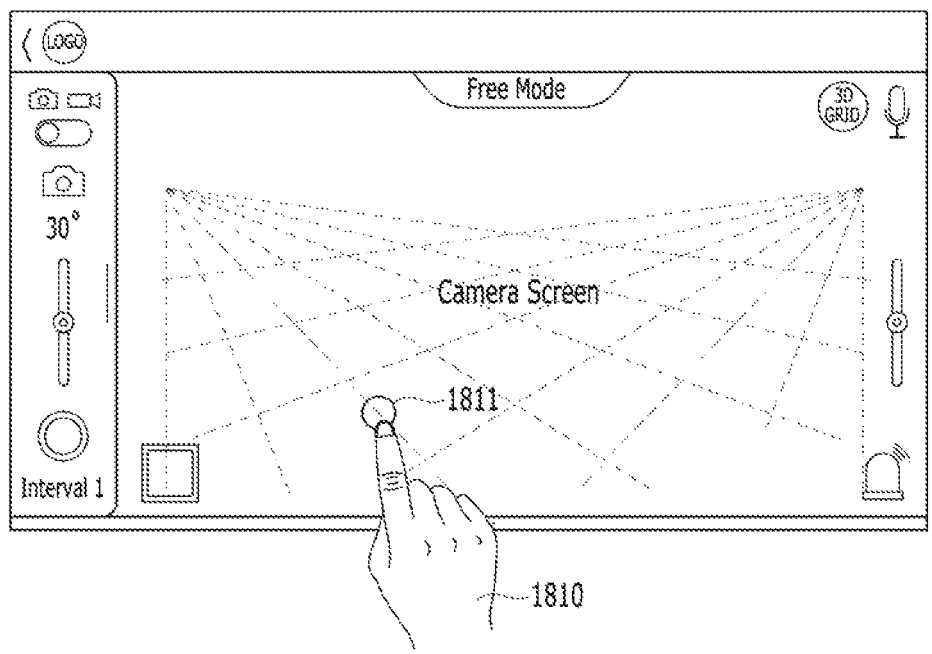

FIG. 18 shows a process for generating a command for pausing a drone in free mode.

Referring to FIG. 18, if a user 1810 touches a screen 1811 of a mobile terminal currently outputting an image taken by a drone, a command for pausing a movement of the drone is generated and transmitted to the drone. Moreover, if a $2^{nd}$ touch is applied, a command for resuming a movement of the drone is generated and transmitted to the drone. Of course, a touch point of the initial touch does not need to be identical to that of the $2^{nd}$ touch. Hence, it is advantageous in that a user does not need to return to a complicated menu screen.

Meanwhile, in the present specification, the $1^{st}$ to $4^{th}$ modes are separately described. And, it is apparent that an operation for one mode to adopt a specific function mentioned in the description of another mode belongs to another scope of the appended claims and their equivalents of the present invention.

Figure 19:
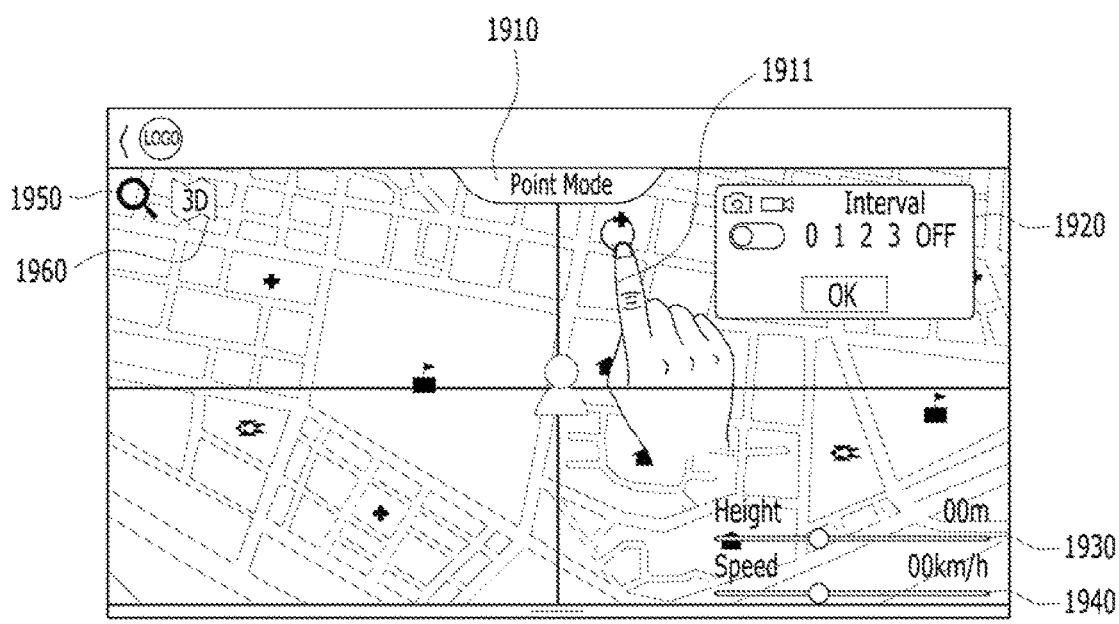
FIGS. 19 to 21 are diagrams to describe a $2^{nd}$ mode for controlling a drone using a mobile terminal according to one embodiment of the present invention.
Figure 20:
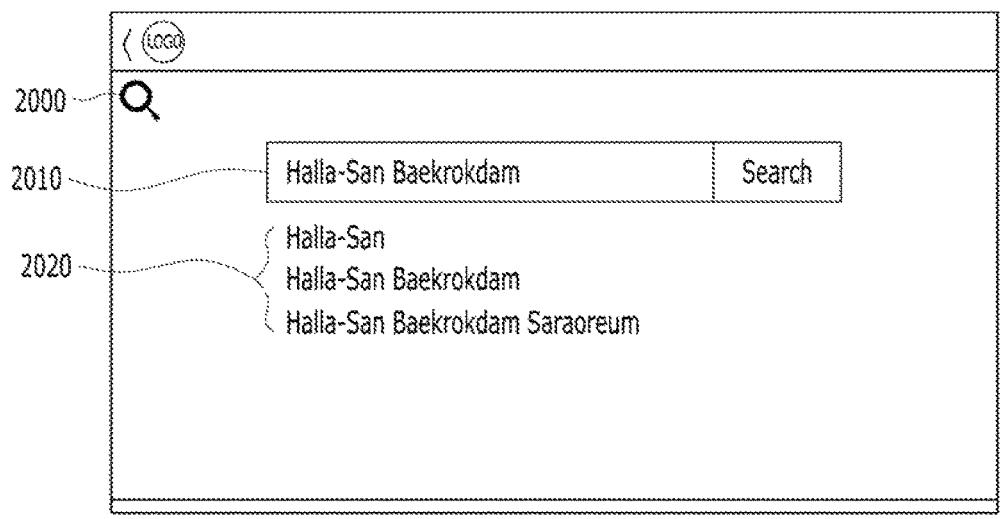
Figure 21:
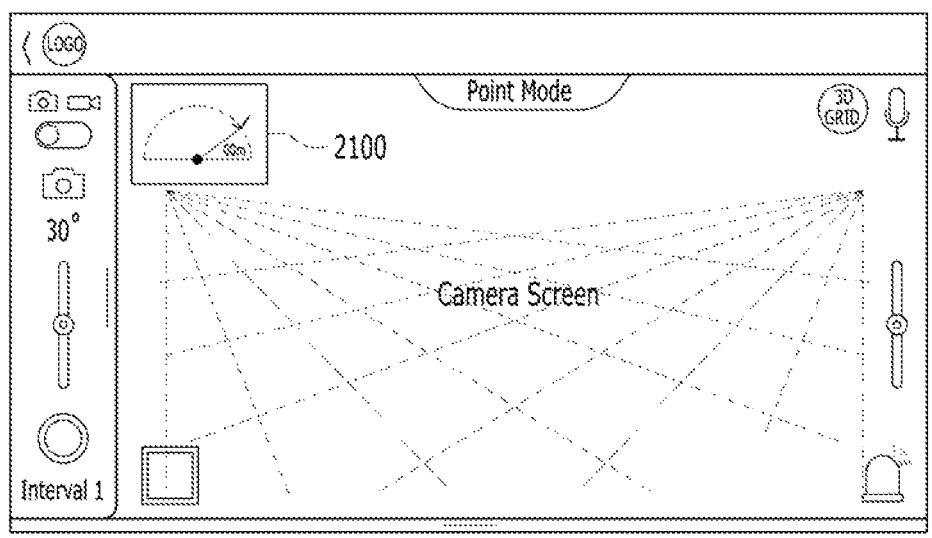

FIGS. 19 to 21 are diagrams to describe a $2^{nd}$ mode for controlling a drone using a mobile terminal according to one embodiment of the present invention. Yet, in the drawings, a term 'POINT MODE' is used instead of a $2^{nd}$ mode. In the description with reference to FIGS. 19 to 21, unlike the aforementioned $1^{st}$ mode (i.e., free mode), a point mode determines a moving direction of a drone just in response to a user's touch to a specific point.

Referring to FIG. 19, a screen 1910 includes a map around a mobile terminal. In doing so, if a user touches a specific point 1911 on the map, a drone moves to the specific point 1911. For instance, the mobile terminal transmits a GPS value corresponding to the selected specific point 1911 to the drone. Hence, it is advantageous in that the user does not need to input a moving distance or GPS information of the specific point 1911 one by one.

Moreover, referring to FIG. 19, a $1^{st}$ menu option 1920 is used to set a time unit for taking photos consecutively through a camera of the drone, a $2^{nd}$ menu option 1930 corresponds to a graphic image indicating an altitude (i.e., height) of the drone, and a $3^{rd}$ menu option 1940 corresponds to a graphic image indicating a speed of the drone. Of course, a design for a user to adjust the $2^{nd}$ menu option 1930 and the $3^{rd}$ menu option 1940 belongs to another scope of the appended claims and their equivalents of the present invention.

Meanwhile, a $4^{th}$ menu option 1960 is used to switch to a 3D map format.

If a $5^{th}$ menu option 1950 is selected, destinations to which the drone can move are outputted as a list. For instance, the outputted destinations may include major tourist attractions and the like around a current location of a mobile terminal. This is described in detail with reference to FIG. 20 as follows.

Referring to FIG. 20, an option for searching major places around a current location of a mobile terminal or a drone is provided in point mode. For instance, if a specific indicator 2000 shown in FIG. 20 is selected, a window 2101 for inputting a search word thereto is displayed.

If a specific keyword is inputted to the window 2010, a list of major tourist attractions related to the corresponding keyword is outputted. Particularly, the list 2020 may be limitedly designed in a manner of being located within a preset distance from a drone or mobile terminal located point. This is the design in consideration of a moving distance of the drone.

Referring to FIG. 21, a point mode provides a mini status screen. In particular, the mini status screen 2100 shown in FIG. 21 is displayed at a preset location, which is variable, within a screen of a mobile terminal and indicates such real-time information of a drone as a moving path, a speed, an altitude and the like. Moreover, if the mini status screen 2100 is touched, it is designed that detailed options for changing a moving path of the drone are displayed, which belongs to another scope of the appended claims and their equivalents of the present invention.

FIGS. 22 to 24(c) are diagrams to describe a $3^{rd}$ mode for controlling a drone using a mobile terminal according to one embodiment of the present invention. Yet, in the drawings, a term 'CIRCLE MODE' is used instead of a $3^{rd}$ mode. Unlike the aforementioned $1^{st}$ or $2^{nd}$ mode, the circle mode determines a moving path of a drone, as shown in FIGS. 22 to 24(c), in a manner that a user touches a specific circle line and then applies a drag.

Figure 22:
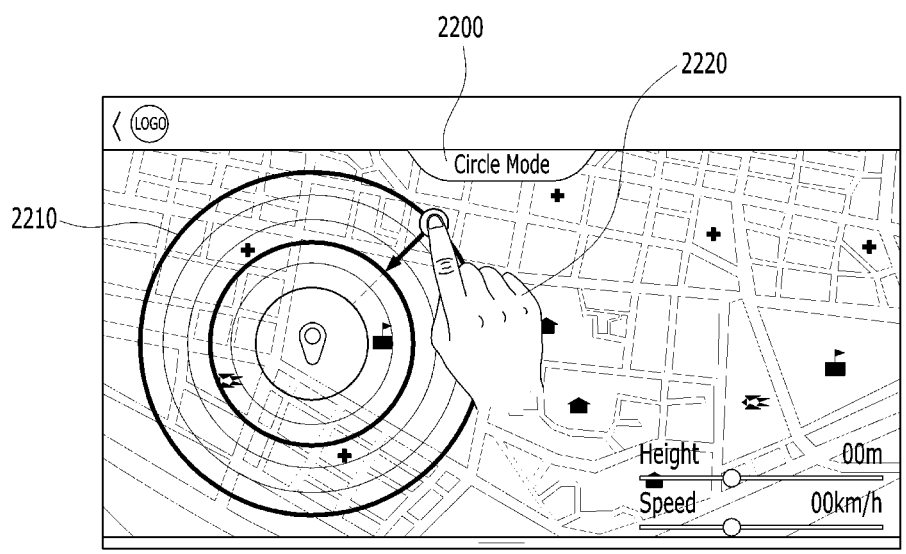
FIGS. 22 to 24(c) are diagrams to describe a $3^{rd}$ mode for controlling a drone using a mobile terminal according to one embodiment of the present invention.

First of all, referring to FIG. 22, if a circle mode 2200 is selected, a circle 2210 is displayed centering on a current location of a mobile terminal or a drone. In doing so, a user 2220 determines a moving path of the drone by selecting and then dragging a specific circle. For instance, the drone is designed to circle round in accordance with the selected radius value, which belongs to another scope of the appended claims and their equivalents of the present invention.

Figure 23:
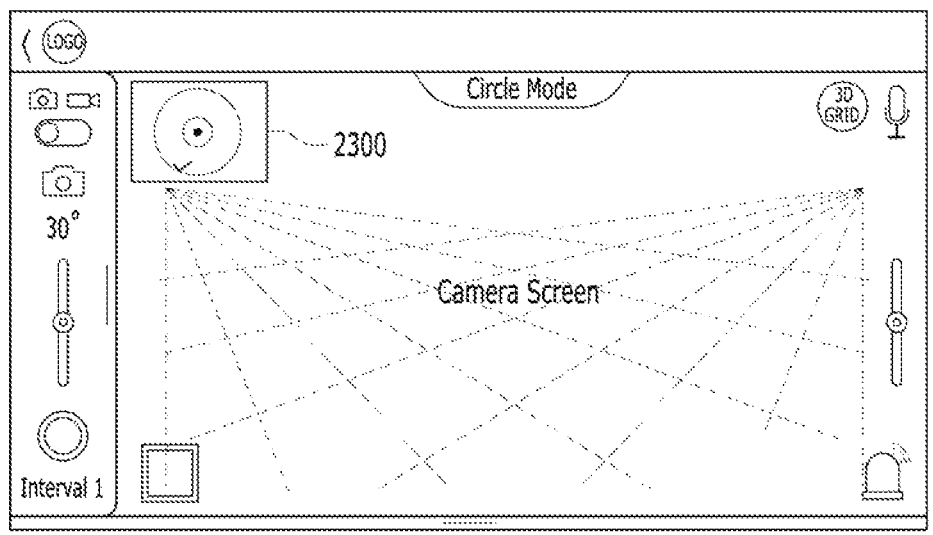

Moreover, referring to FIG. 23, a circle mode is designed to display a mini status screen 2300 at a specific location of a mobile terminal as well. The mini status screen 2300 displays a moving speed of a drone, a speed of the drone and the like by real time. Moreover, if the mini status screen 2300 is touched, it is designed that detailed options for changing a moving path of the drone are displayed, which belongs to another scope of the appended claims and their equivalents of the present invention.

Figure 24A:
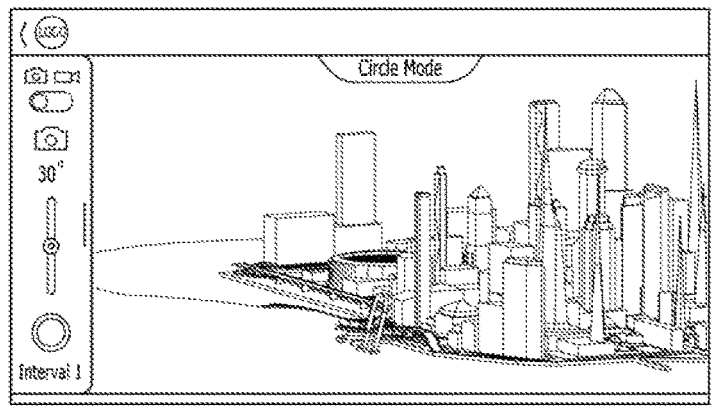
Figure 24B:
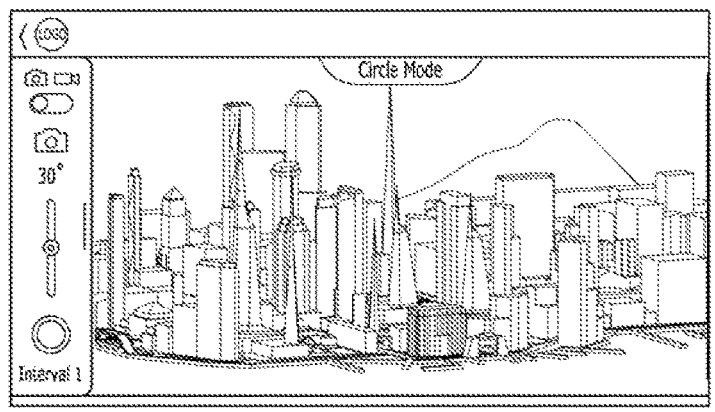
Figure 24C:
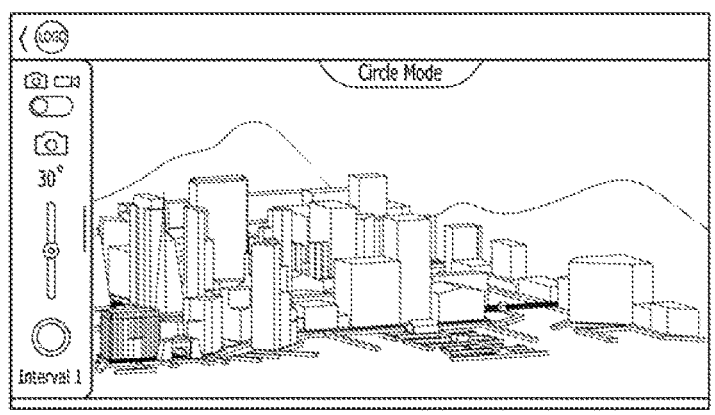
Figure 25A:
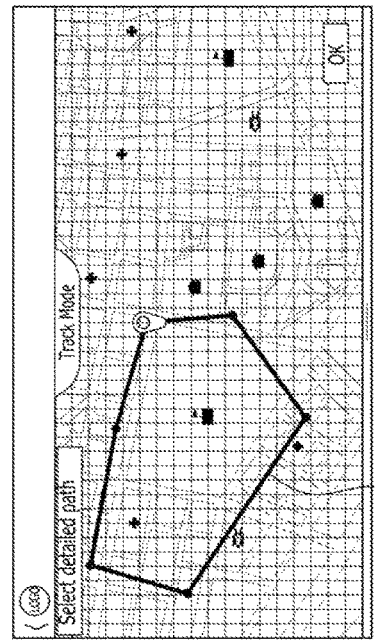
FIGS. 25(a) to 29 are diagrams to describe a $4^{th}$ mode for controlling a drone using a mobile terminal according to one embodiment of the present invention.
Figure 25B:
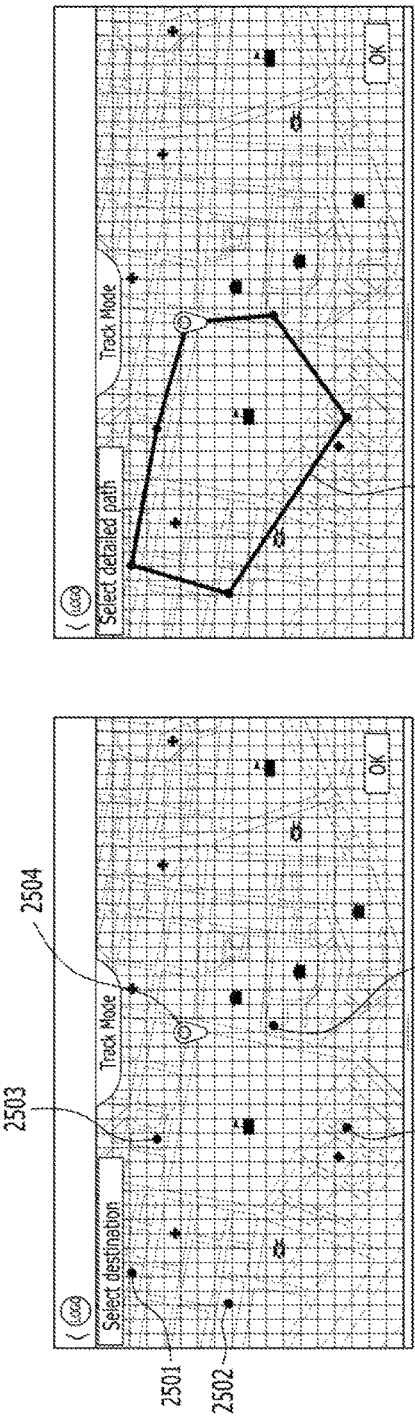
Figure 25C:
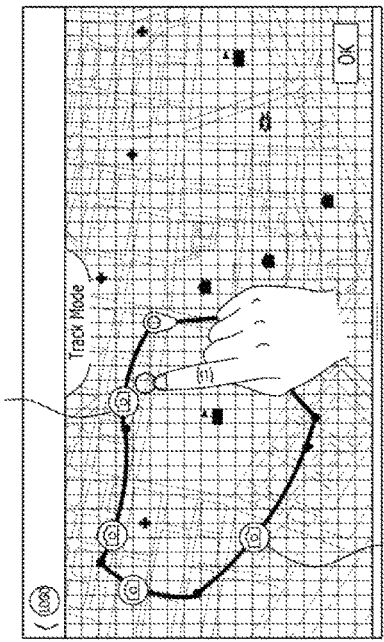
Figure 25D:
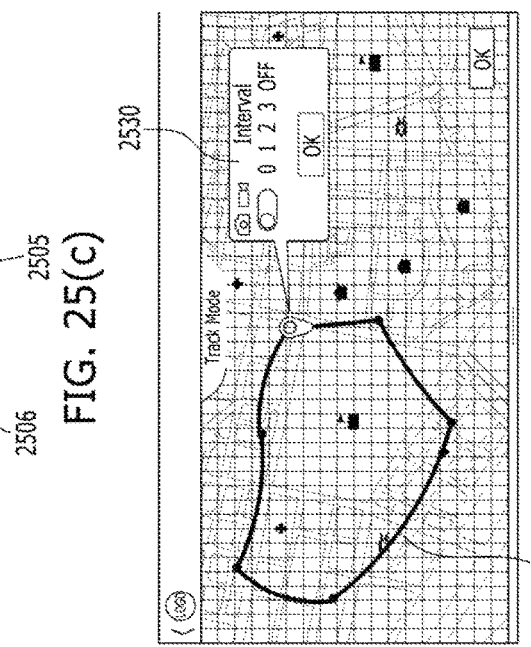

FIGS. 24(a)-24(c) show an auto panoramic photo mode provided by a circle mode. In particular, a $1^{st}$ image shown in FIG. 24 (a) corresponds to an image data of a specific point taken at a $1^{st}$ angle, a $2^{nd}$ image shown in FIG. 24 (b) corresponds to an image data of a specific point taken at a $2^{nd}$ angle, and a $3^{rd}$ image shown in FIG. 24 (c) corresponds to an image data of a specific point taken at a $3^{rd}$ angle. The taken images shown in FIGS. 24 (a) to 24 (c) are saved as a single panoramic photo in a memory of a drone or a mobile terminal. Particularly, if a user does not establish special settings in circle mode, it is designed to operate in the panoramic photo mode shown in FIG. 24.

FIGS. 25(a) to 29 are diagrams to describe a $4^{th}$ mode for controlling a drone using a mobile terminal according to one embodiment of the present invention. Yet, in the drawings, a term 'TRACK MODE' is used instead of a $4^{th}$ mode. Unlike the aforementioned 3 kinds of modes, it is advantageous in that a track mode enables a user to quickly select at least two paths, as shown in FIGS. 25(a) to 29.

In particular, according to a track mode mentioned in the following description, a user can set a path of a drone in advance by selecting at least two points from a grid on a map. In more particular, it is advantageous in that a camera mode to be activated in the drone can be individually selected per interval in advance. For instance, a photograph mode (for shooting a photo or video), an interval of a photo taking, a presence or non-presence of a curved driving or a straight driving and the like can be set up in advance.

Referring to FIG. 25 (a), assume that a user has selected 6 random points 2501 to 2506 from a map within a screen of a mobile terminal. In this case, referring to FIG. 25 (b), a straight path configured to connect the respective points sequentially is displayed.

Yet, the present invention is characterized in that a user can change a straight line of connecting the respective points by applying a drag [cf. FIG. 25 (c)]. Moreover, referring to FIG. 25 (c), an option 2520 for adjusting an interval of a photo taking is displayed per path.

Finally, referring to FIG. 25 (d), a camera mode of a drone can be changed for each path. For instance, it is set up not to take pictures on a $1^{st}$ path 2540. For another instance, it is set up to allow a photo taking on a $2^{nd}$ path 1550. Hence, technical effects of preventing a photo taking unnecessary for a user and memory consumption in advance can be provided.

Figure 26:
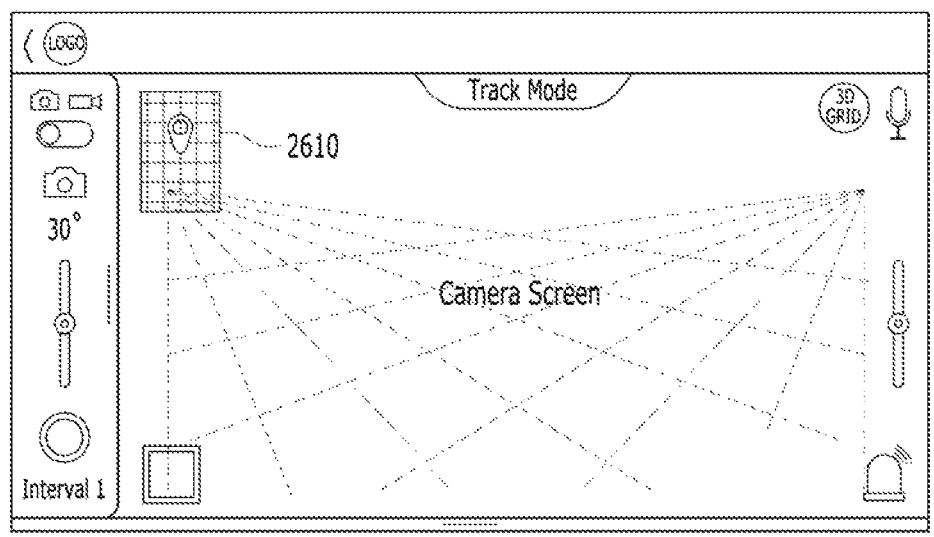

Moreover, referring to FIG. 26, a track mode is designed to display a mini status screen 2610 at a specific location on the display of a mobile terminal. In this case, the mini status screen 2610 displays a moving path of a drone, a speed of a drone and the like by real time. If the mini status screen 2610 is touched, it is designed to display detailed options for changing the moving path of the drone, which belongs to another scope of the appended claims and their equivalents of the present invention.

Figure 27:
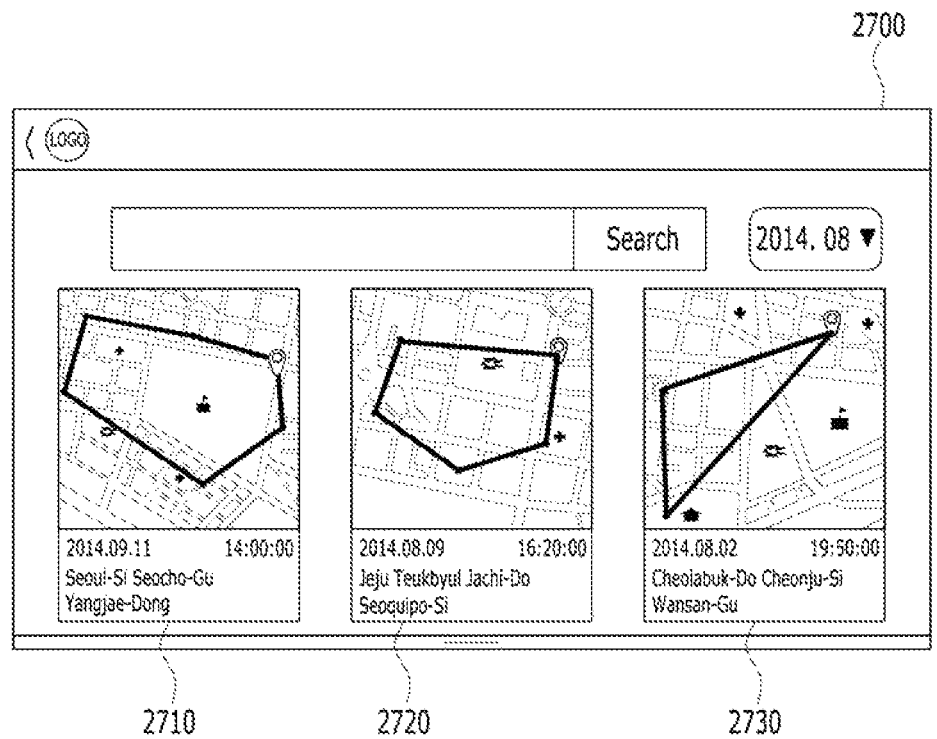
Figure 28:
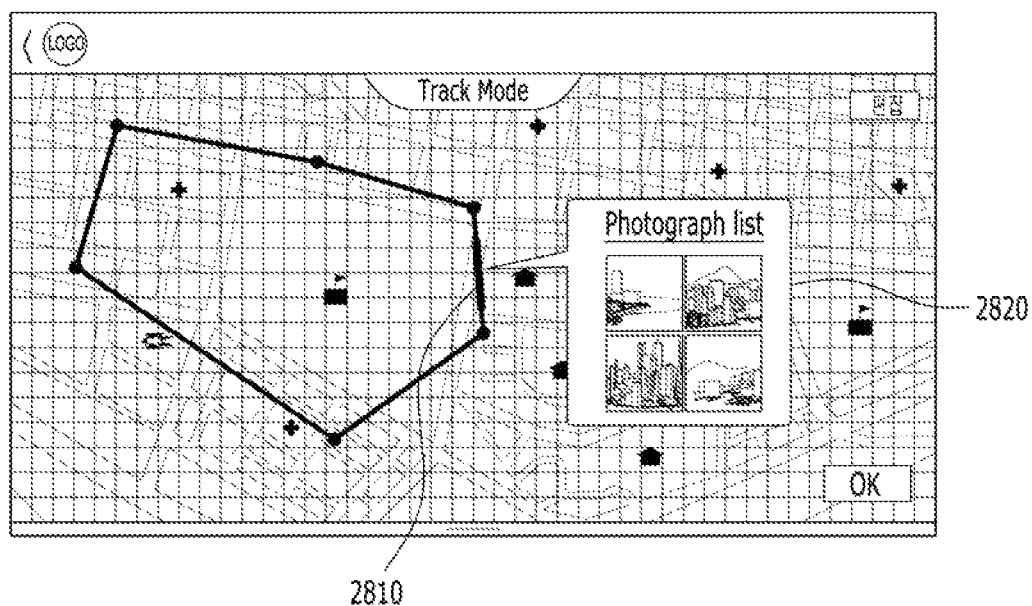

Meanwhile, FIG. 27 and FIG. 28 show embodiments for managing a taken photo or a video separately per interval in track mode.

First of all, referring to FIG. 27, paths (intervals) shot by a drone are saved in a history folder of a mobile terminal on dates 2710, 2720 and 2730, respectively. If a specific date 2700 is selected, photos and videos belonging to a range of the corresponding date are limitedly displayed only.

Moreover, if a specific date is selected from the folder corresponding to at least two dates shown in FIG. 27, a screen shown in FIG. 28 is outputted. Particularly, referring to FIG. 28, if a specific interval 2810 is selected, photos or videos taken in the selected specific interval are limitedly displayed as a list 2820.

Besides, other image data having a GPS value belonging to a preset range from a currently located point of a mobile terminal or a drone are outputted as a list [not shown in FIG. 27 and FIG. 28]. For instance, it is possible to bring a different photo having an identical or similar GPS value through an internet connection. In doing so, if a user selects a specific image data photographed by another person, it is designed that the drone photographs a point of the same GPS information and direction based on the corresponding GPS information and the corresponding direction information, which belongs to another scope of the appended claims and their equivalents of the present invention. Moreover, in case that a plurality of photos taken with a frequently used composition exist among photos (image data) saved in a mobile terminal, a drone is designed to take photos with the same composition with reference to them, which belongs to another scope of the appended claims and their equivalents of the present invention.

Figure 29:
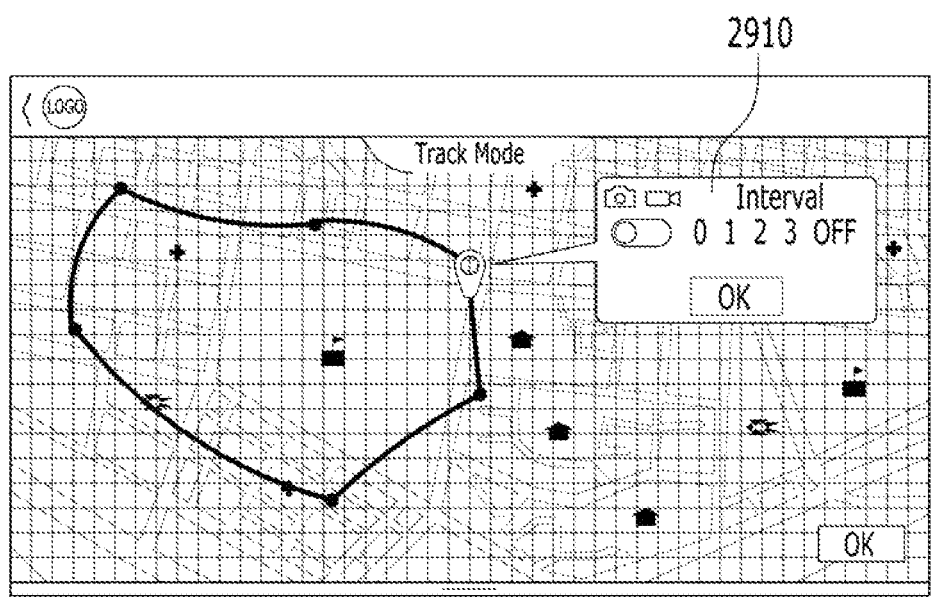

Moreover, referring to FIG. 29, it is possible to change a specific interval of a moving path in track mode. For instance, by touching and dragging a specific interval among intervals of a moving path shown in FIG. 29, it is able to quickly edit a detailed path. As mentioned in the foregoing description, an option 2910 for changing a camera mode of a specific interval is displayed. The option 290 shown in FIG. 29 selects an interval of a camera photographing for example, by which the scope of the appended claims and their equivalents of the present invention is non-limited.

FIGS. 30 to 34 are diagrams of editing data shot by a drone under the control of a mobile terminal according to one embodiment of the present invention. FIGS. 30 to 34 are applicable to all embodiments of the $1^{st}$ to $4^{th}$ modes mentioned in the foregoing description.

Figure 30:
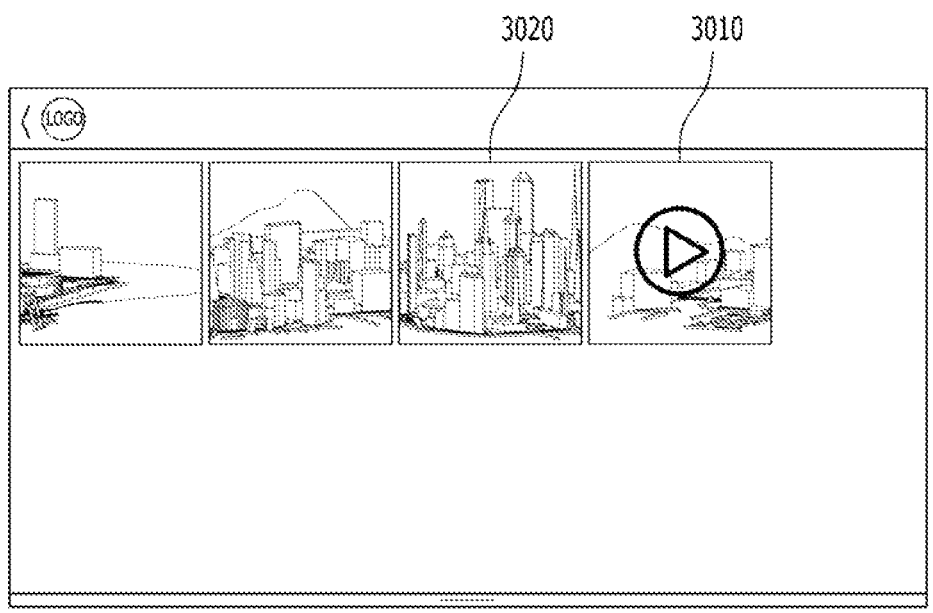
FIGS. 30 to 34 are diagrams of editing data shot by a drone under the control of a mobile terminal according to one embodiment of the present invention.

First of all, referring to FIG. 30, a photo 3020 or video 3010 shot in one of the aforementioned $1^{st}$ to $4^{th}$ modes is saved in a memory of a mobile terminal. Of course, the photo 3020 or the video 3010 can be additionally saved in a memory of a drone as well.

If a random photo 3020 shown in FIG. 30 is selected, it is enlarged into a full screen. If the enlarged photo is selected again, it returns to a screen including the list shown in FIG. 30.

Meanwhile, FIGS. 31 to 34 show embodiments of sharing information related to a photo or video shot by a drone with another device.

Figure 31:
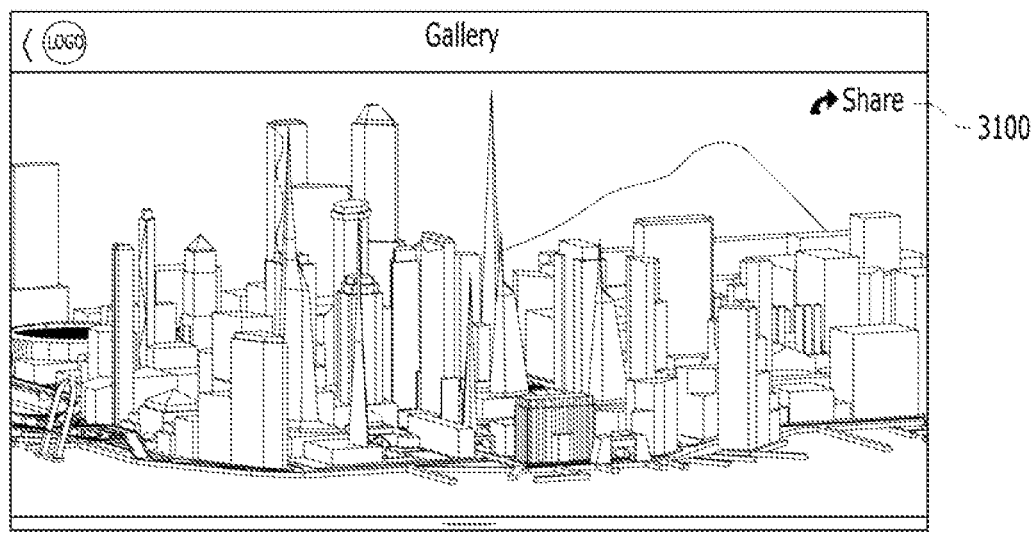

First of all, referring to FIG. 31, if a specific photo taken by a drone is selected, a tab 3100 for sharing the photo with a $3^{rd}$ device is automatically created and outputted. In this case, the $3^{rd}$ device corresponds to a specific mobile device, a server, a website or the like.

Figure 32:
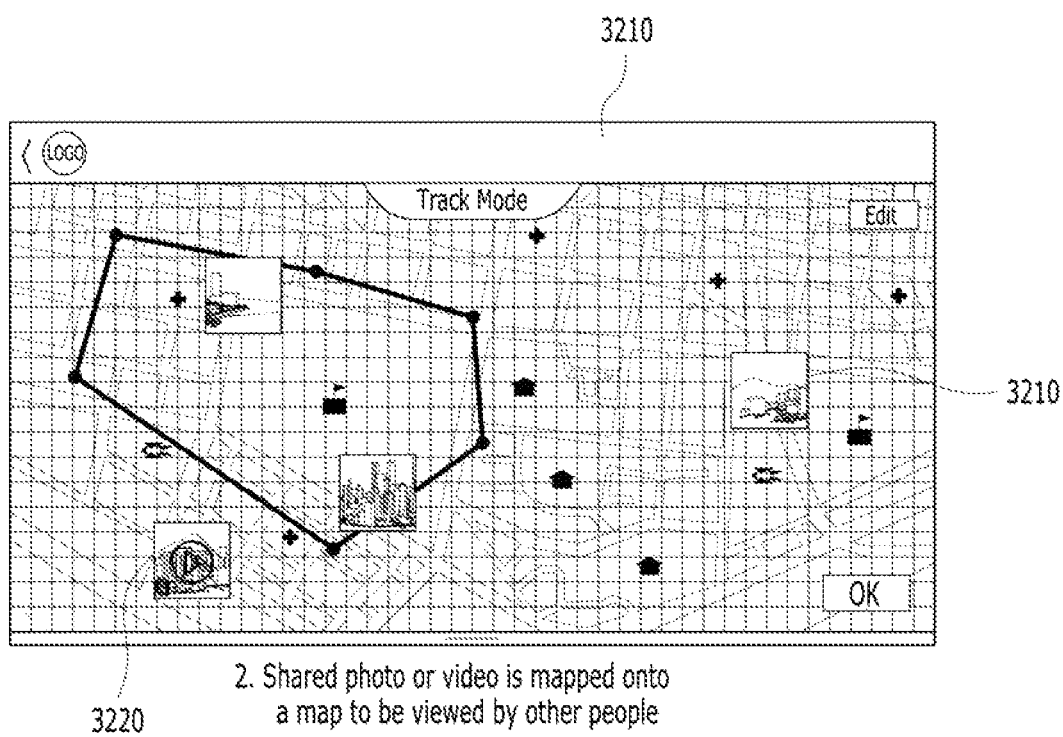

Moreover, referring to FIG. 32, the shared photo shown in FIG. 31 is outputted to a map in a mapped form. For instance, in case that a photo is uploaded to a random SNS, at least one or more photos 3210 and 3220 mapped per point shot by the drone are displayed on the map.

Figure 33:
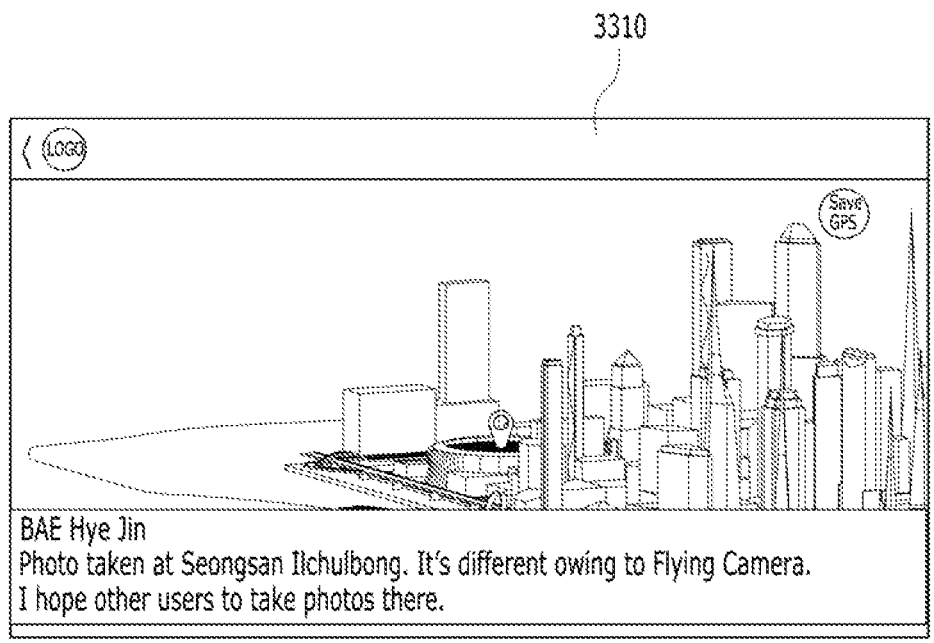
Figure 34:
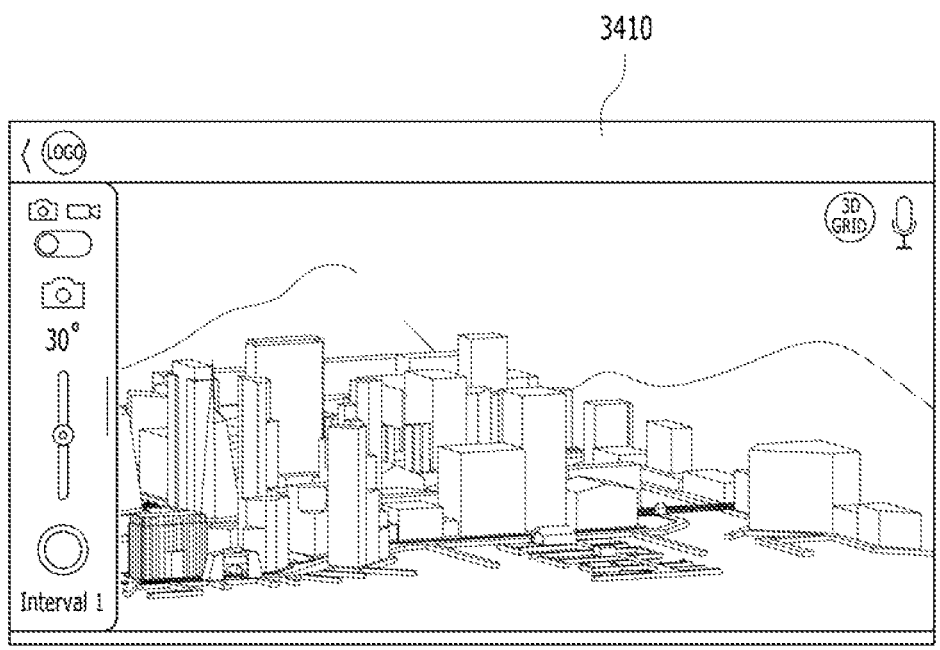

Referring to FIG. 33, in case of a mobile terminal capable of internet communication, photos or videos shot by other people can be outputted. In doing so, if a user selects a specific photo 3310, GPS information and angle information of the selected photo are extracted. Finally, in case that the extracted GPS and angle informations in FIG. 33 are transmitted to a drone, referring to FIG. 34, it is able to take a similar photo 3410.

The operations of the mobile terminal described with reference to FIGS. 1 to 34 are summarized and described as follows. Some steps can be deleted, modified or added and the order of the steps can be changed.

First of all, a method of controlling a mobile terminal according to one embodiment of the present invention may include the steps of performing a communication connection to at least one drone, displaying a screen for controlling a motion of the communication-connected drone, receiving a random touch drag within the displayed screen, generating a $1^{st}$ control data for controlling an altitude of the drone if the received touch drag is recognized as a $1^{st}$ direction with reference to a memory, generating a $2^{nd}$ control data for controlling right and left directions of the drone if the received touch drag is recognized as a $2^{nd}$ direction with reference to the memory, transmitting at least one of the generated $1^{st}$ control data and the generated $2^{nd}$ control data to the drone, and receiving a video data shot through a camera of the drone. The memory has been already described in detail with reference to FIG. 7.

The mobile terminal controlling method according to another embodiment of the present invention may further include the steps of receiving a signal for selecting a random point within the displayed screen, transmitting a location information of an object corresponding to the point to the drone, and receiving a video data including the object from the drone.

The mobile terminal controlling method according to another embodiment of the present invention may further include the steps of receiving a touch drag of a circle type and saving at least two photos taken in accordance with a direction of the circle type as a single file.

The screen may include a map including a location of the mobile terminal or the drone.

The mobile terminal controlling method according to another embodiment of the present invention may further include the steps of displaying an information on a specific location within the map and at least one photo belonging to a preset range (in this case, the at least one photo is received from an external server), extracting a tag information of a specific photo selected from the at least one photo, transmitting the extracted tag information to the drone, and receiving a video data shot on the basis of the tag information from the drone.

As mentioned in the foregoing description, the tag information includes at least one of a GPS information and a direction information of a taken photo for example.

The present invention mentioned in the foregoing description can be implemented into an application downloadable to a mobile terminal or a basic application provided as a default to the mobile terminal.

The above-described methods can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a drone using a mobile terminal, the method comprising:
   establishing communication with a drone;
   displaying a screen for controlling the drone on a touchscreen of the mobile terminal, wherein the displayed screen comprises a map including a location of the mobile terminal;
   causing a change in altitude of the drone in response to a first drag input received via the touchscreen in a first direction;
   causing the drone to rotate about an axis while in flight according to a second direction at which a second drag input is received via the touchscreen;
   displaying video data obtained via a camera of the drone;
   transmitting location information related to an object to the drone in response to a touch input received at a point of the displayed screen, the point corresponding to the object; and
   receiving video data including the object from the drone.

2. The method of claim 1, further comprising:
   storing at least two photos obtained by the drone as a single file in a memory in response to a third drag input received via the touchscreen in a circular pattern, the at least two photos obtained via the camera according to a direction corresponding to the circular pattern.

3. The method of claim 1, further comprising:
   displaying information related to a specific location within the map and at least one photo within a preset range, the at least one photo received from an external server;
   obtaining tag information associated with a specific photo selected from the at least one photo;
   transmitting the obtained tag information to the drone; and
   receiving video data that is obtained by the drone based on the tag information.

4. The method of claim 3, wherein the tag information comprises Global Position System (GPS) information and direction information associated with the specific photo.

5. The method of claim 1, further comprising storing at least two modes used to change a moving path of the drone in a memory.

6. The method of claim 1, further comprising:
   transmitting a control signal for commanding a panoramic photograph mode to the drone in response to a third drag input received via the touchscreen in a circular pattern; and
   transmitting a control signal for commanding a burst photograph mode to the drone in response to a fourth drag input received via the touchscreen in a pinch-in or pinch-out pattern.

7. The method of claim 1, further comprising displaying a status screen at a specific location of the touchscreen while the video data is displayed on the touchscreen, the status screen comprising information related to a status of the drone.

8. A mobile terminal comprising:
   a communication unit configured to communicate with a drone;

a touchscreen; and
a controller configured to:
cause the touchscreen to display a screen for controlling the drone, wherein the displayed screen includes a map including a location of the mobile terminal;
cause a change in altitude of the drone in response to a first drag input received via the touchscreen in a first direction;
cause the drone to rotate about an axis while in flight according to a direction at which a second drag input is received via the touchscreen;
cause the touchscreen to display video data obtained via a camera of the drone;
cause the communication unit to transmit location information related to an object to the drone in response to a touch input received at a point of the displayed screen, the point corresponding to the object; and
cause the communication unit to receive video data including the object from the drone.

9. The mobile terminal of claim 8, further comprising a memory, wherein the controller is further configured to cause the memory to store at least two photos obtained by the drone as a single file in a memory in response to a third drag input received via the touchscreen in a circular pattern, the at least two photos obtained via the camera according to a direction corresponding to the circular pattern.

10. The mobile terminal of claim 8, wherein the controller is further configured to:
cause the touchscreen to display information related to a specific location within the map and at least one photo within a preset range, the at least one photo received from an external server;
obtain tag information associated with a specific photo selected from the at least one photo;
cause the communication unit to transmit the obtained tag information to the drone; and
cause the communication unit to receive video data that is obtained by the drone based on the tag information.

11. The mobile terminal of claim 10, wherein the tag information comprises Global Position System (GPS) information and direction information associated with the specific photo.

12. The mobile terminal of claim 8, further comprising a memory, wherein the controller is further configured to cause the memory to store at least two modes used to change a moving path of the drone.

13. The mobile terminal of claim 8, wherein the controller is further configured to cause the communication unit to:
transmit a control signal for commanding a panoramic photograph mode to the drone in response to a third drag input received via the touchscreen in a circular pattern; and
transmit a control signal for commanding a burst photograph mode to the drone in response to a fourth drag input received via the touchscreen in a pinch-in or pinch-out pattern.

14. The mobile terminal of claim 8, wherein the controller is further configured to cause the touchscreen to display a status screen at a specific location of the touchscreen while the video data is displayed on the touchscreen, the status screen comprising information related to a status of the drone.

* * * * *